US010070106B2

(12) United States Patent
Ferri et al.

(10) Patent No.: US 10,070,106 B2
(45) Date of Patent: Sep. 4, 2018

(54) OPTICAL SYSTEM DESIGNS FOR GENERATION OF LIGHT FIELDS USING SPATIAL LIGHT MODULATORS

(71) Applicant: Texas Instruments Incorporated, Dallas, TX (US)

(72) Inventors: John Marshall Ferri, Allen, TX (US); Gregory Scott Pettitt, Farmersville, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 125 days.

(21) Appl. No.: 15/185,699

(22) Filed: Jun. 17, 2016

(65) Prior Publication Data

US 2016/0373701 A1    Dec. 22, 2016

Related U.S. Application Data

(60) Provisional application No. 62/180,936, filed on Jun. 17, 2015.

(51) Int. Cl.
*H04N 9/31* (2006.01)
*H04N 13/04* (2006.01)
(Continued)

(52) U.S. Cl.
CPC ........... *H04N 9/312* (2013.01); *G03B 21/005* (2013.01); *G03B 35/16* (2013.01); *H04N 9/3138* (2013.01);
(Continued)

(58) Field of Classification Search
CPC .... G03B 21/005; G03B 21/28; G03B 21/206; G03B 21/2033; H04N 13/0014;
(Continued)

(56) References Cited

U.S. PATENT DOCUMENTS 5,113,285 A    5/1992  Franklin et al.
6,317,171 B1   11/2001 Dewald
(Continued)

OTHER PUBLICATIONS

"Light Field Rendering", by Marc Levoy and Pat Hanrahan, ACM SIGGRAPH '96, Jul. 1996, pp. 1-12.
(Continued)

*Primary Examiner* — Sultan Chowdhury
(74) *Attorney, Agent, or Firm* — Michael A. Davis, Jr.; Charles A. Brill; Frank D. Cimino

(57) ABSTRACT

In described examples, a method of creating multiple light images uses spatially-separated light sources, arranged in an array, operated in multiplexed fashion, for driving a spatial light modulator. Each of the light sources is time-sequenced to direct light at the spatial light modulator during a time interval. The spatial light modulator is synchronized with the light sources and controlled to produce a desired image during each time interval. The resulting images are received by an optical lens system to provide light images along an image plane. Alternately, the optical lens system focuses the modulated light images on a hogel plane to produce a light field. The pixel count of the spatial light modulator is effectively multiplied by the number of light sources.

41 Claims, 16 Drawing Sheets

(51) Int. Cl.
*G03B 35/16* (2006.01)
*G03B 21/00* (2006.01)
(52) U.S. Cl.
CPC ......... *H04N 9/3161* (2013.01); *H04N 9/3164* (2013.01); *H04N 13/0406* (2013.01); *H04N 13/0418* (2013.01)
(58) Field of Classification Search
CPC ........... H04N 13/0055; H04N 13/0402; H04N 13/0404; H04N 13/0409; H04N 13/0438; H04N 13/0456; G02B 27/0093; G02B 27/225; G02B 27/2214; G02B 27/2278
See application file for complete search history.

(56) References Cited

U.S. PATENT DOCUMENTS

| | | |
|---|---|---|
| 6,437,919 B1 | 8/2002 | Brown et al. |
| 6,567,584 B2 | 5/2003 | Carlisle et al. |
| 6,665,100 B1 | 12/2003 | Klug et al. |
| 6,795,241 B1 | 9/2004 | Holzbach |
| 6,798,409 B2 | 9/2004 | Thomas et al. |
| 6,927,748 B2 | 8/2005 | Hughes et al. |
| 2003/0151821 A1* | 8/2003 | Favalora ............... G02B 26/106 359/619 |
| 2008/0143736 A1* | 6/2008 | Clatanoff ............. G09G 3/3406 345/590 |
| 2008/0144174 A1 | 6/2008 | Lucente et al. |
| 2010/0277928 A1 | 11/2010 | Fancello et al. |
| 2011/0038163 A1 | 2/2011 | Fancello et al. |
| 2011/0038167 A1 | 2/2011 | Fancello et al. |
| 2011/0199658 A1 | 8/2011 | Blanche et al. |
| 2011/0285968 A1 | 11/2011 | Huang |
| 2013/0335795 A1 | 12/2013 | Song et al. |
| 2014/0340724 A1 | 11/2014 | Won et al. |

OTHER PUBLICATIONS

"DLP® LightCrafter(TM) FPGA Overview", Texas Instruments Incorporated, Application Report, DLPA042, Oct. 2013, pp. 1-12.
DMD 101: Introduction to Digital Micromirror Device (DMD) Technology, Texas Instruments Incorporated, Application Report, DLPA008A, Jul. 2008, revised Oct. 2013, pp. 1-11.

\* cited by examiner

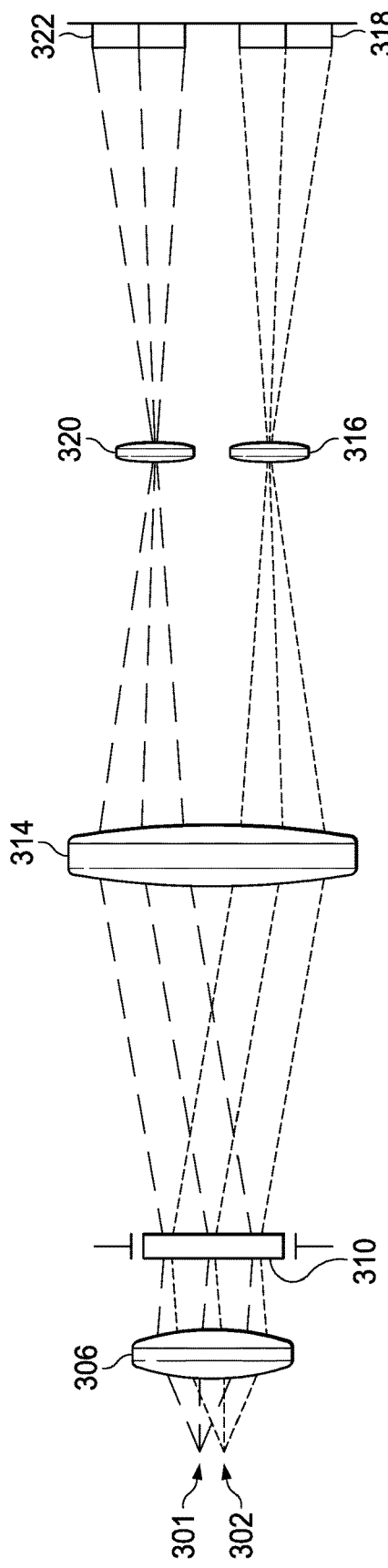
FIG. 9
FIG. 10B
FIG. 10A

OPTICAL SYSTEM DESIGNS FOR GENERATION OF LIGHT FIELDS USING SPATIAL LIGHT MODULATORS

CROSS-REFERENCE TO RELATED APPLICATION

This application claims priority to U.S. Provisional Patent Application Ser. No. 62/180,936, filed Jun. 17, 2015, entitled OPTICAL SYSTEM DESIGNS FOR GENERATION OF LIGHT FIELDS USING SPATIAL LIGHT MODULATORS, which is hereby fully incorporated herein by reference for all purposes.

BACKGROUND

This relates generally to three-dimensional ("3D") display systems, and more particularly to optical system designs for generation of light fields using spatial light modulators ("SLMs").

Some conventional visual display units (including computer screens, television screens and movie theater screens) produce a two-dimensional image that lacks true depth perception. Past efforts have been made to create visual displays for producing images having three dimensions ("3D"). Some conventional 3D displays produce a 3D effect by presenting each eye with a different scene, typically shifted in position to generate a parallax effect. In a simple example of these 3D displays, 3D glasses provide a first view to a first eye and a second view to a second eye. One such example is disclosed in U.S. Pat. No. 5,113,285 to Franklin, et al. These 3D glasses use either: a state of light polarization to separate the images; or a high speed shutter over each eye to isolate the first eye view from the second.

Some 3D displays generate imagery using a multiview architecture, instead of requiring special glasses. These systems create a different view of the scene for each position of the observer, but the observer is often limited to a small viewing area, or eyebox. One example of such a multiview display system is disclosed in U.S. Pat. No. 6,798,409 to Thomas, et al.

Some 3D displays use the concept of "light fields" to avoid a requirement for special glasses, and to avoid confining the viewer to a fixed or small set of viewing positions. These light field displays create an image similar to a hologram's image, but these displays generate a dynamic image without using photographic recording holographic plates or films.

A light field includes rays of light that pass through a viewing window. Those rays are emitted from objects either beyond or in front of the viewing window, so all of the light rays reflected from objects viewed through the viewing window are captured at a particular instant in time and space. Such a light field is shown schematically in FIG. 1, where a number of light rays (including those designated 30 and 40, reflecting off of different objects in space) pass through a common plane or viewing window 20. Each such light ray has a particular x-y position and a particular angular direction as it passes through the viewing window 20.

The general concept of light fields is discussed in greater detail within the technical paper entitled "Light Field Rendering," by Marc Levoy and Pat Hanrahan of the Computer Science Department at Stanford University, *Proc. ACM SIGGRAPH*, 1996. The viewing of the light field is the most natural way of viewing objects. Light rays emitted by the light field contain information about the position, color, brightness and extent of the viewed objects. Artificially reproducing this light field will create a plane emitting light rays that, when observed, will appear to reproduce a scene in full 3D, as if the viewer is seeing real objects emitting such light.

To create an artificial light field, some display systems use many spatial light modulators ("SLMs") to satisfy high pixel density requirements of high-quality 3D image representation. An SLM device is capable of receiving a beam of light, receiving electrical signals defining a desired graphic pattern, and selectively modulating the received light beam (relative to amplitude, phase and/or polarization of its light waves in space and time) to produce a patterned two-dimensional light image incorporating the desired graphic pattern.

Two types of SLMs are translucent and reflective. A commonly used modulation mechanisms is the electro-optical spatial light modulator containing liquid crystals as the modulation material. The optical properties of the liquid crystals are modified by an electric field. The translucent SLMs typically use liquid crystal display (LCD) elements. The incoming light pattern is directed at the front face of the LCD display, and the modulated light pattern passes out through the rear face of the LCD display. Some reflective SLMs use liquid crystal on silicon ("LCoS") display elements to modulate an incoming light beam through selective reflection of rays of light. The SLM includes one or more control inputs for receiving control signals, typically from a computer, specifying the graphic pattern to be produced by the SLM.

Another form of SLM is a digital micromirror device ("DMD"), commercially available from Texas Instruments Incorporated of Dallas, Tex. A DMD includes an array of highly reflective aluminum micromirrors. The DMD is an electrical input, optical output micro-electrical-mechanical system ("MEMS") that performs high speed, efficient and reliable spatial light modulation. The DMD is manufactured using semiconductor manufacturing processes. Each DMD contains up to 8 million individually controlled micromirrors built over an associated CMOS memory cell. During operation, the DMD controller loads each underlying memory cell with a logical "1" ("on") or a logical "0" ("off"). Next, a mirror reset pulse is applied, which causes each micromirror to be electrostatically deflected about a hinge to either a +12° state or a −12° state, depending upon whether the underlying memory cell is a "1" or a "0". The array of micromirrors reflect incoming light at different angles, depending upon the binary logical state of each micromirror. When viewed perpendicular to the reflective surfaces of the "on" micromirrors, a desired patterned image is observed. In a projection system, the +12° state corresponds to an "on" pixel, and the −12° state corresponds to an "off" pixel. Grayscale patterns are created by programming the on/off duty cycle of each mirror, and multiple light sources can be multiplexed to create full RGB color images.

As mentioned hereinabove, 3D display systems can use the concept of light fields. To create the light field, a relatively large number of SLMs can produce a corresponding number of images that are "tiled" together to form a composite larger image. To create the light field, each SLM provides a bundle of addressable, modulated light rays, which are focused through a small region. This small region is called a light "hogel." An array of such hogels, each having its own set of addressable angular distribution of light rays, forms the basis of the light field display.

In one example, a high quality light field display has: a high hogel density within a two-dimensional plane; and, from each hogel, a high density of addressable light rays, each having specific angular orientation. Also, a 3D dynamic image requires updating these hogels at a relatively high refresh rate. These conditions create a need for displays with a very high pixel density, including with a very large number of pixels that can be updated at high speed to generate the array of hogels and their far field ray distributions, as required to create a dynamic 3D light field display. Unfortunately, such displays have required a large number of relatively expensive SLMs to create this large number of pixels.

Further, conventional 3D display systems often require high intensity light sources to provide light to illuminate SLMs, which can add to the physical size, power requirements and cooling requirements of 3D projection systems.

SUMMARY

In described examples, a method uses a spatial light modulator in a multiplexed fashion to create multiple light images, spatially separate from each other. The multiple light images can be "tiled" to produce a larger image. This method provides a number of spatially-separated light source elements, either in a linear array or in a two-dimensional array. A spatial light modulator receives light sourced from each of the light source elements. The method includes alternately selecting at least one, and possibly two or more, of the light source elements to be operable during a corresponding interval of time, and directing the light from the selected light source element(s) at the spatial light modulator during such time interval. During each such time interval, the spatial light modulator is controlled to emit a predetermined light image corresponding to the particular light source(s) selected during that time interval.

BRIEF DESCRIPTION OF THE DRAWINGS

FIG. 9 is a basic design layout drawing similar to FIG. 8, but showing light paths swept by a 2×2 array of light sources.

FIG. 10A is a frontal view of the 2×2 array of light sources represented in FIG. 9.

FIG. 10B is a frontal view of four light images, arranged in a 2×2 array, resulting from the light sources of FIG. 10A.

DETAILED DESCRIPTION OF EXAMPLE EMBODIMENTS

Example embodiments solve a problem of dynamically creating a relatively large number of pixels for a high quality 3D display system, while reducing a number of SLMs. Also, example embodiments produce high quality 3D display systems and provide a light field (in the form of an array of light hogels), at reduced cost. Further, example embodiments eliminate one or more high intensity light sources within the same housing that contains an electro-optical system for generating 3D images. Moreover, example embodiments allow sources of light for driving 3D display systems to be efficiently shared among two or more 3D display systems.

Figure 2:
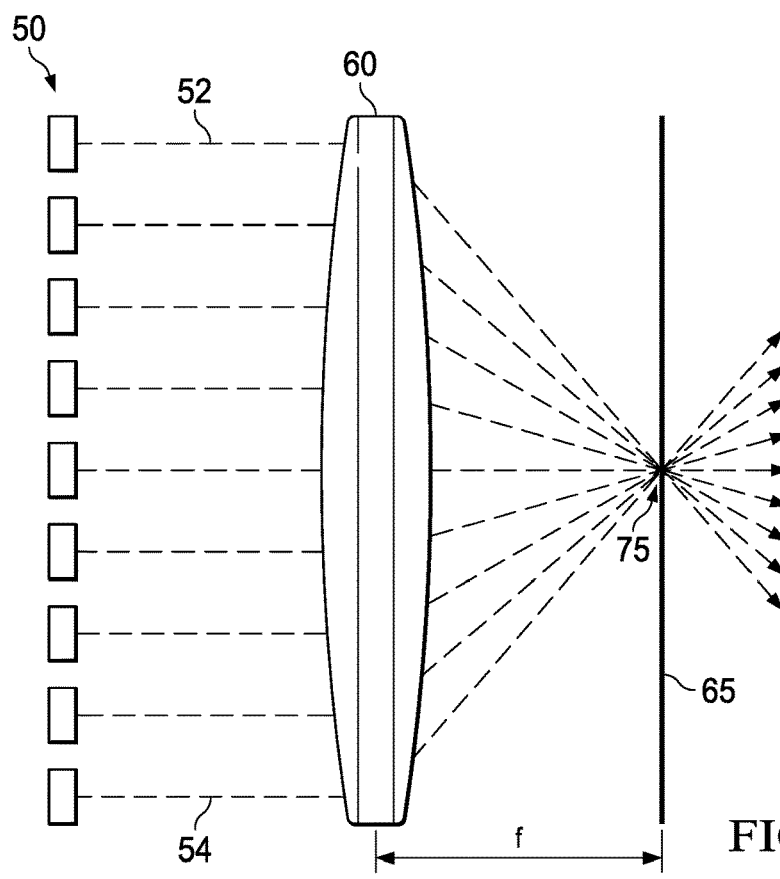
FIG. 2 graphically depicts generation of a light hogel from a two-dimensional pixel array and a lens.

Conventional SLMs produce a two-dimensional image, or two-dimensional pixel array. For example, the Texas Instruments DVD model number DLP7000 provides a micromirror array measuring 1024 columns by 768 rows, corresponding to a video image known as XGA. Referring to FIG. 2, a two-dimensional pixel array, which might correspond to the image provided by an SLM, is designated by reference numeral 50. Light rays projected from array 50, including light rays 52 and 54, pass through lens 60 and are focused upon a focal point 75 within a hogel plane 65 formed at the focal distance f from lens 60. The light rays passing out of focal point 75 form one light hogel. As shown in FIG. 2, the light rays provided from pixel array 50 are converted into various angles at hogel plane 65. Preferably, the hogel plane 65 includes a mask having patterned apertures located at each hogel position, including position 75, to limit the angular extent or degree of collimation of the light rays.

If desired, the pixels of an SLM could be subdivided into pixel groups, and each group could have its own lens element. As a simple example, an SLM providing a pixel array of 1024×768 pixels could be subdivided into sixteen arrays, or pixel groups, each consisting of 256×192 pixels. Each of those pixel groups could have its own lens (16 lenses in total, arranged 4×4) to provide 16 separate hogels along hogel plane 65. However, as such pixel arrays become further sub-divided, they reduce the amount of light information provided by each hogel and likewise reduces the quality of the resulting 3D image.

Figure 3:
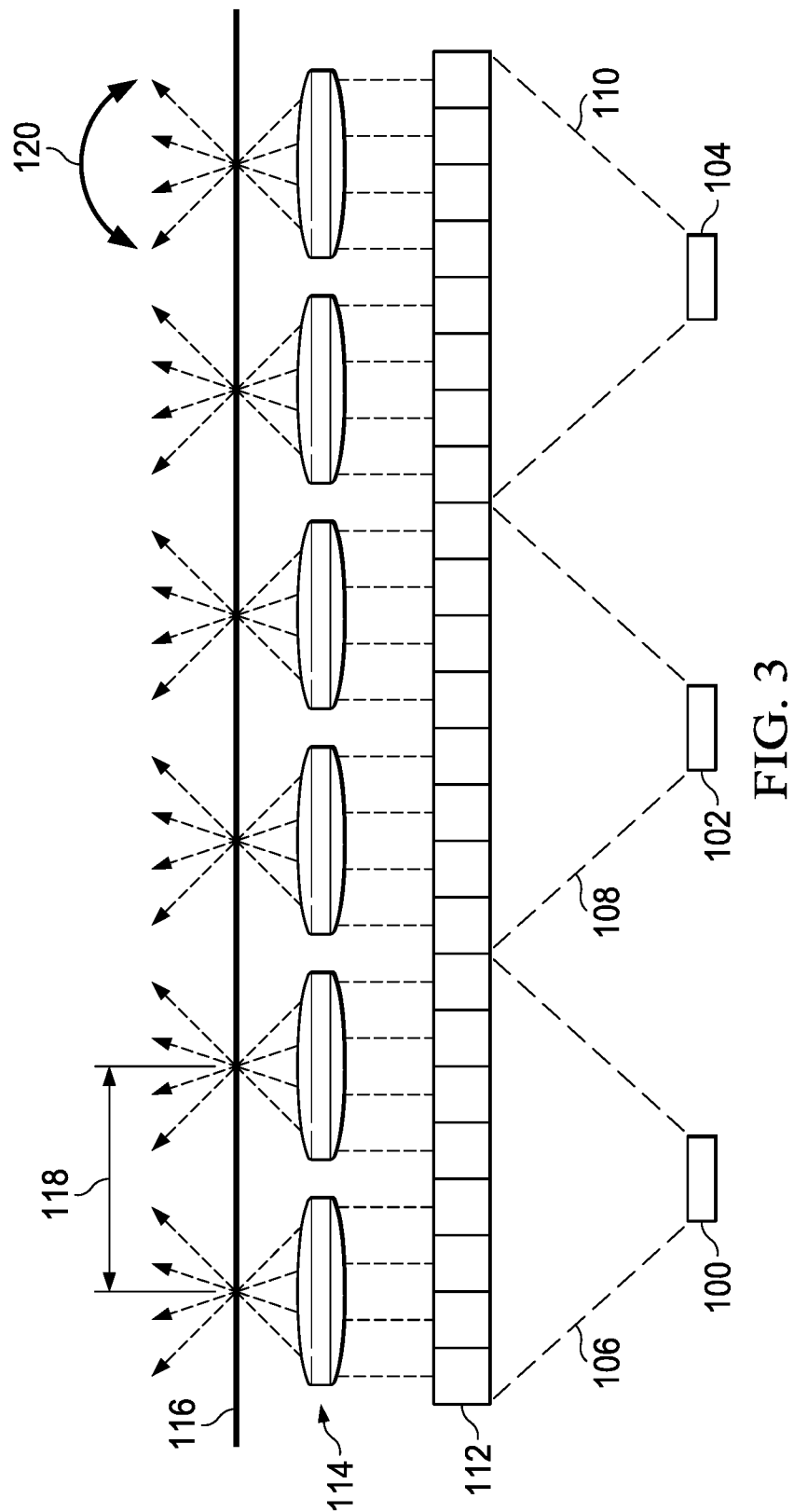
FIG. 3 shows use of multiple SLMs, along with suitable optics, to generate hogels for a 3D light field display.

FIG. 3 shows a technique of using multiple SLMs to create an array of hogels. Within this simplified drawing, three SLMs 100, 102 and 104 provide patterned images that are conveyed by optics elements 106, 108 and 110, respectively, up to image plane 112. The light emitted by image plane 112 is passed through lens array 114 to create a series of hogels along hogel plane 116. In FIG. 3, the hogel pitch is designated by arrow 118 and represents the distance separating adjacent hogels within hogel plane 116. An arc 120 represents the number of light rays included within each light hogel. In the example of FIG. 3, the pixels of each SLM are subdivided into two groups (at least along one dimension), for forming two hogels. Thus, three SLMs produce six hogels. As mentioned hereinabove, SLM devices can be relatively expensive, so the 3D system's expense increases if a greater number of SLMs are used. Also, a larger 3D system enclosure is required to package multiple SLMs.

Figure 4:
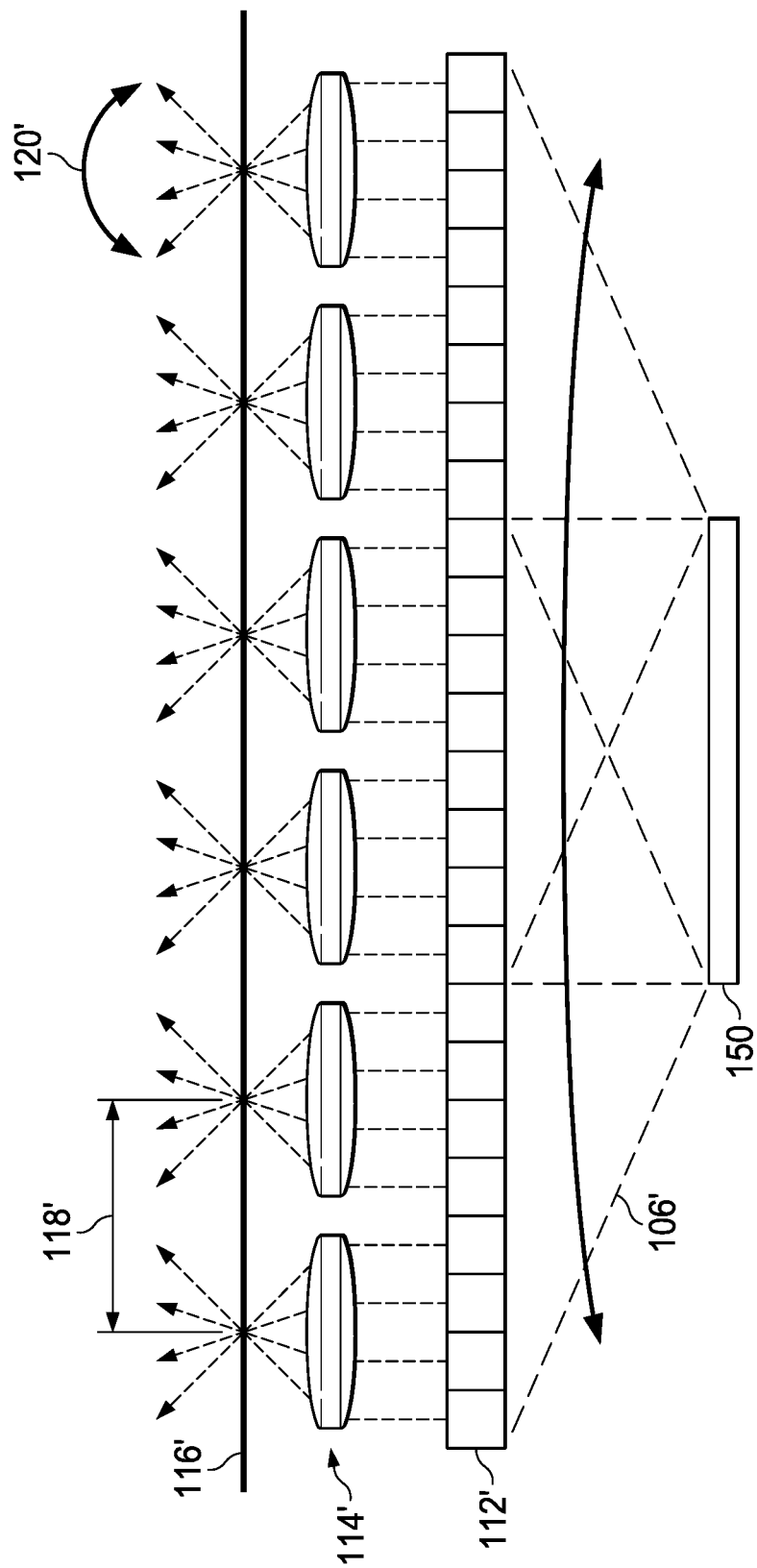
FIG. 4 is a schematic concept drawing that illustrates how multiplexing light sources to a single SLM is useful to recreate the hogel plane of FIG. 3.

In contrast, FIG. 4 shows a single SLM 150, which may be a DMD micromirror array. To the extent that components of FIG. 4 correspond to components of FIG. 3, those components are designated by similar primed reference numerals. By multiplexing spatially-separated light sources directed at SLM 150, in a manner described hereinbelow, the light images resulting from the single SLM 150 may be caused to effectively sweep across image plane 112', again producing six hogels, with the same hogel pitch 118' as FIG. 3. Optical image multiplexing is achieved by creating multiple images with a single SLM through time sequencing an array of light sources, in a manner described hereinbelow. Moreover, through the use of lens arrays, each SLM image shown in FIG. 4 produces multiple hogels. A single SLM replaces the three separate SLMs shown in FIG. 3, thereby reducing cost, reducing space requirements, and creating power savings.

Figure 5:
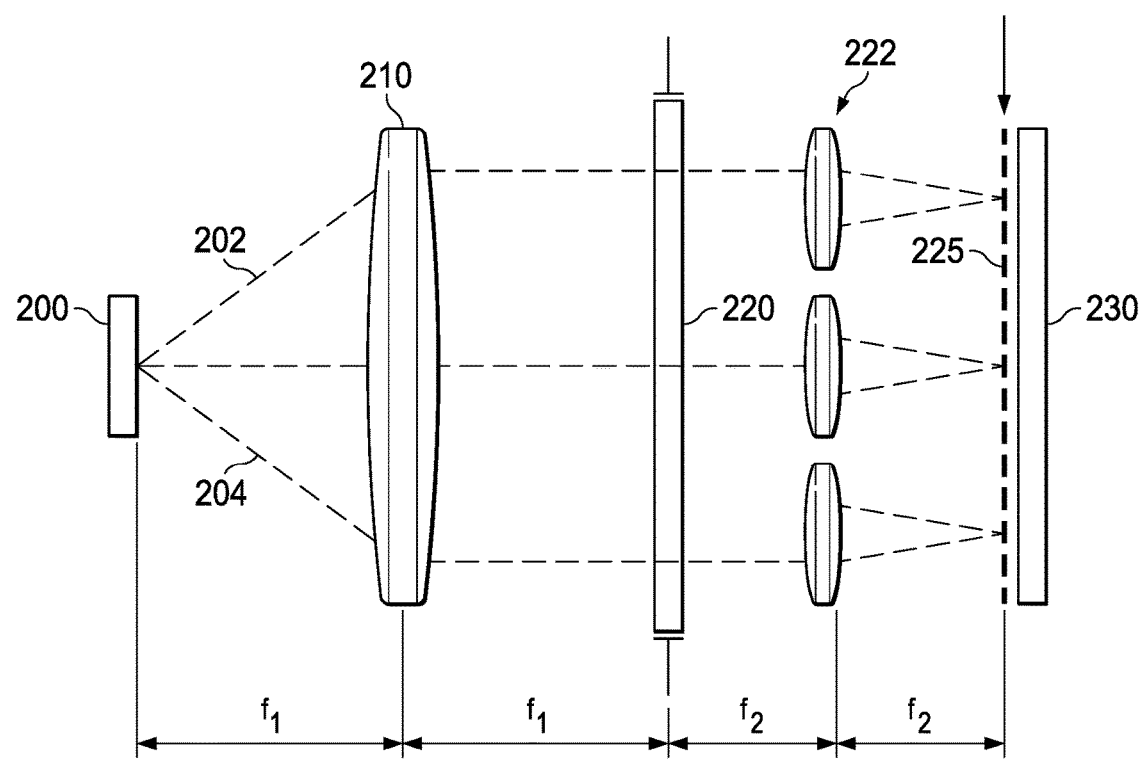
FIG. 5 is a schematic drawing that shows how a lens array is useful to optically multiply a light hogel produced by a single light source and a single SLM.

FIG. 5 illustrates a method for using an optical system to generate multiple hogels using a single light source and a single SLM. This method may also be used in combination with example embodiments of this disclosure. In FIG. 5, light source 200 emits light rays including 202 and 204. A lens 210 having a focal length $f_1$ is positioned at the focal distance away from light source 200. SLM 220 is disposed at focal distance $f_1$ beyond lens 210 for receiving light rays passed by lens 210. For purposes of illustration, the figures show light rays passing through SLMs, such as SLM 220 in FIG. 5. However, SLM 220 could be either a transmissive-type SLM or a reflective-type SLM, without changing the overall function of the described system. SLM 220 modulates the light rays received from lens 210, in accordance with electrical control signals received by its control circuitry from a computer or other control device, and projects patterned light rays, shown in FIG. 5 as passing to the right. The patterned light rays projected from SLM 220 are intercepted by a lens array 222, including three lens elements. The three lens elements of lens array 222 each have a focal length of $f_2$. Lens array 222 is positioned at one focal length beyond SLM 220. Light rays intercepted by lens array 222 are focused at focal length $f_2$ beyond lens array 222 along hogel plane 225, thereby providing three light hogels along hogel plane 225 based upon a single light source and a single SLM 220. If desired, far-field angle space expander optics 230 may be provided adjacent hogel plane 225 to project a 3D image.

Referring to FIG. 5, single light source 200 may be capable of alternately producing different colors, such as the traditional red (R), green (G), and blue (B). Although light source 200 is a single light source, it can be time-multiplexed over three time intervals, corresponding to a red interval, a green interval, and a blue interval. Alternatively, light source 200 may provide multi-primary colors consisting of red, green, blue along with other colors such as yellow, cyan, magenta, white, and others. Temporally cycling through the different colors eliminates a need to have separate R, G, B color filter elements for a single pixel, such as with a transmissive TFT display or an OLED display. This improves the pixel density and the quality of the far field ray angle distribution at each hogel, resulting in a sharper image.

The simplified system of FIG. 5 provides multiple hogels from a single SLM. Theoretically, such multiple hogels could be "tiled together" to create a larger 3D display, but such architecture would require a large number of SLMs, because creation of a large viewable 3D display would require tiling together of a large number of these display systems. Packaging such a large number of SLMs can be difficult within the confined space of a display container. Heat dissipation and cooling can also be difficult with closely packed SLMs.

Figure 6:
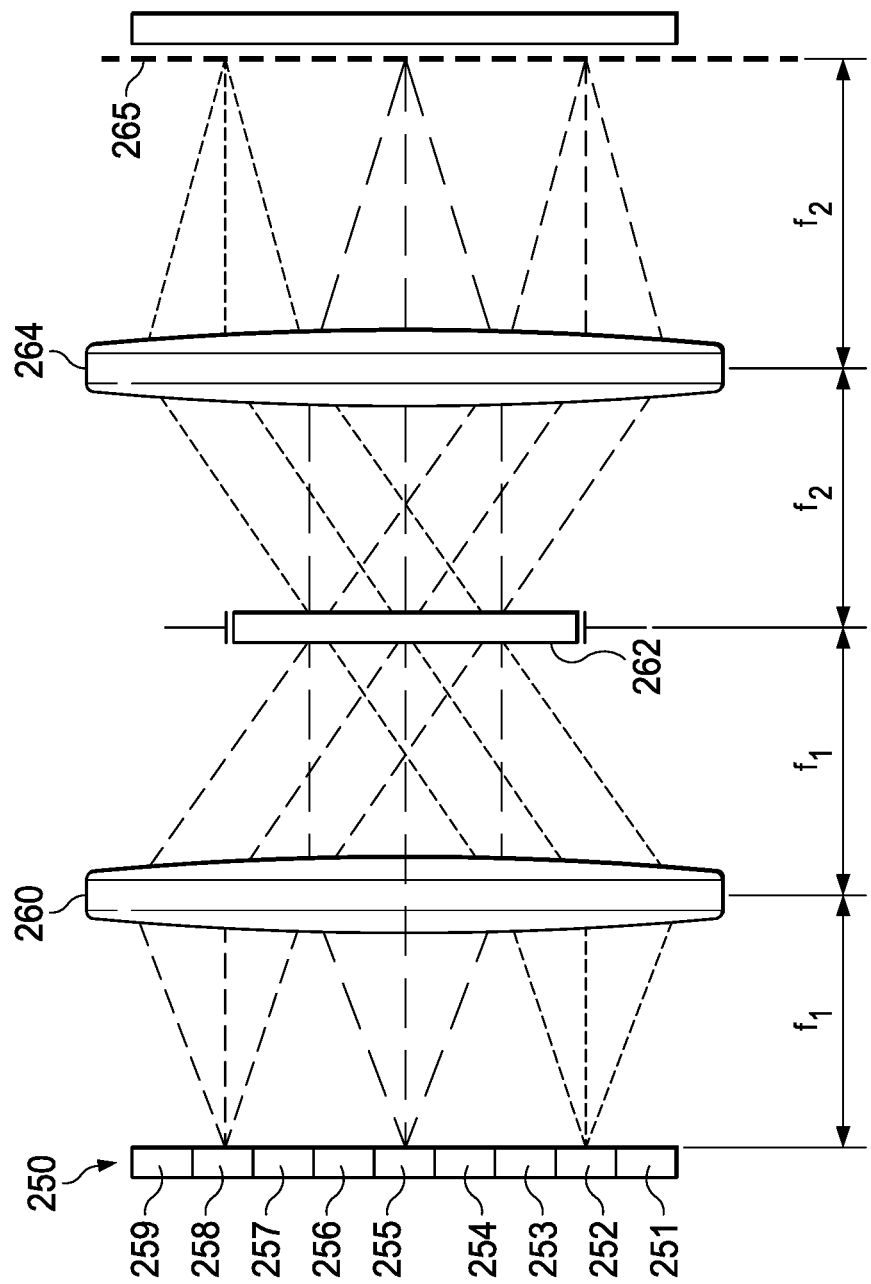
FIG. 6 is a schematic drawing that illustrates how a light source array is useful, in conjunction with optical lenses and a single SLM, to generate multiple hogels along a hogel plane.

FIG. 6 shows an example embodiment using a light source array 250. In FIG. 6, light source array 250 includes nine separate light sources 251-259, which are arranged in a linear array to simplify the illustration. Light source array 250 could also be a two-dimensional array of light sources. Each of light sources 251-259 is activated in timed sequence to direct light at lens system 260. In turn, lens system 260 focuses received light upon SLM 262. Control signals applied to SLM 262 are synchronized with the sequencing of light sources 251-259, so a separate patterned image is created for each time interval corresponding to each such light source. For example, suitable electronic controllers for controlling patterned images to be produced by a DMD (digital micromirror device) are commercially available from Texas Instruments Incorporated of Dallas, Tex., such as the Model No. DLPC300 controller and its associated chipset. The patterned light rays projected from SLM 262 are directed at a second lens system 264 and focused along hogel plane 265. In this manner, nine separate hogels are produced at hogel plane 265 by a single SLM 262, equal in number to the number of light sources 251-259 in light source array 250. Accordingly, each element of light source array 250 images to the hogel plane 265.

If light source array 250 in FIG. 6 is a two-dimensional array of light sources arranged in m rows and n columns, then an array of m times n hogels would be provided at hogel plane 265 by the single SLM 262. SLM 262 can quickly sequence through a set of hogels. As the light source array is sequenced, a single hogel is effectively moved across the image space, or hogel plane. A direct correspondence exists between the location of the active light source in light source array 250, and the location of the resulting hogel in hogel plane 265. Only one hogel is created per light source element. This embodiment allows for a very high density of light rays to be created per hogel. This may be useful in cases where hogel density is less important than the sampling of the far field light distribution.

In a straightforward implementation of the method illustrated in FIG. 6, only one light source is enabled within light source array 250 during any given time interval, so only one hogel is produced in hogel plane 265 during that time interval. In this manner, SLM 262 can be reconfigured during each time interval to create a particular pixel pattern for each separate light source. However, when two or more light sources require the same identical pixel pattern to be produced by SLM 262 in a given display cycle, then enabling two or more light sources within light source array 250 is possible during the same time interval, thereby providing two or more light hogels at the same time. In this case, the number of required time intervals for a particular display cycle can be reduced, thereby allowing the frequency of display cycles to be increased. This same technique of selecting two or more light sources at the same time, when they share common pixel patterns to be produced by the spatial light modulator, is also useful in practicing the other embodiments described hereinbelow.

Figure 7:
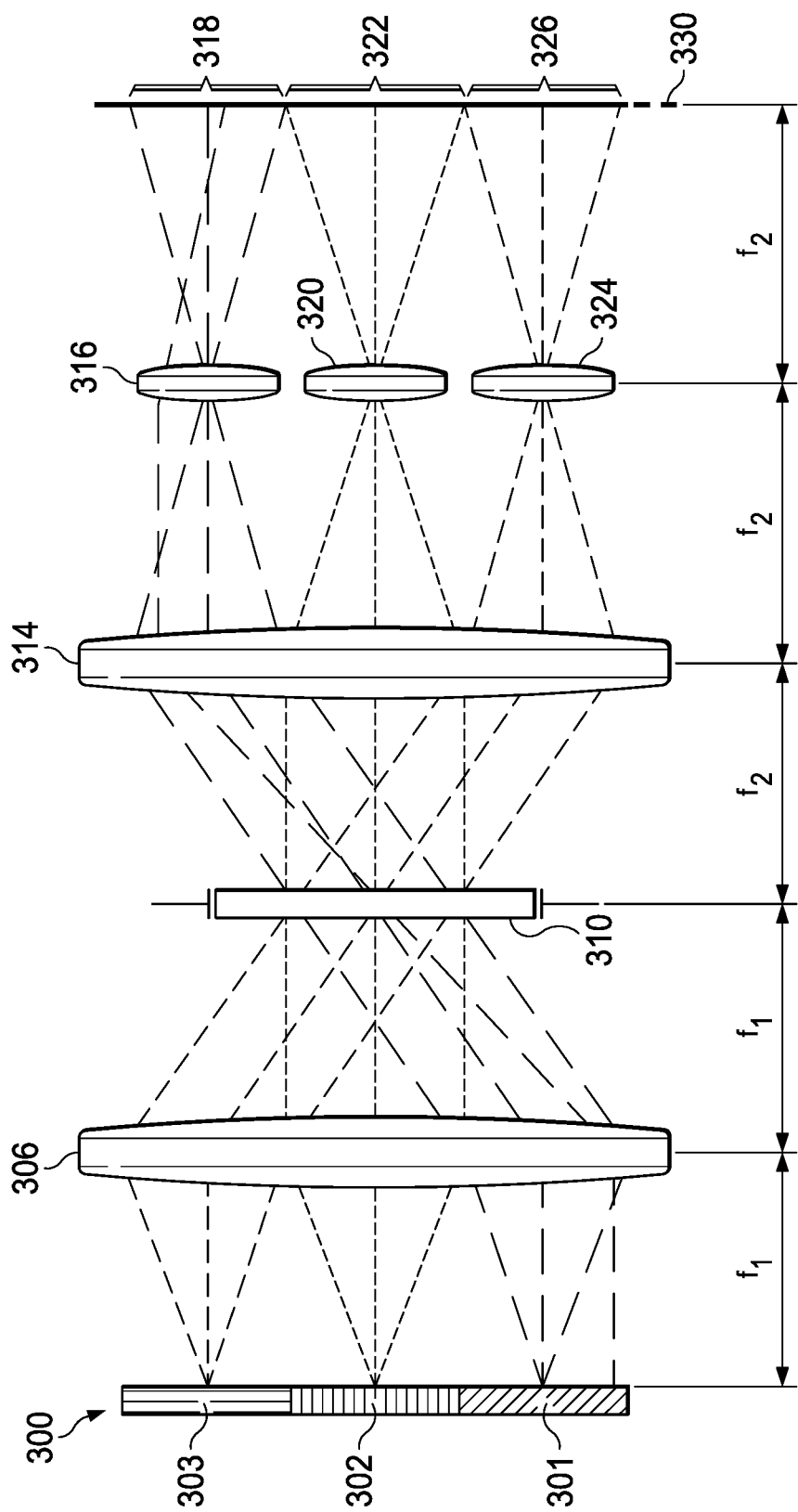
FIG. 7 is a schematic drawing similar to FIG. 6, but including an additional lens system for focusing multiple images through an image plane.

FIG. 7 illustrates a method similar to the method of FIG. 6, but for projecting multiple images through an image plane, in which the multiple images are tiled together to form a larger image. In FIG. 7, light source array 300 includes light source elements 301, 302 and 303. Light source elements 301-303 are illustrated as being in a linear one-dimensional array, but light source array 300 could actually be a two-dimensional array. Each light source 301-303 in light source array is selected, one at a time, in time-sequenced fashion, during each display cycle. Light emitted by each light source 301-303 is directed at input lens 306, which focuses the received light rays upon SLM 310. As shown in FIG. 7, input lens 306 has a focal length $f_1$, and input lens 306 is positioned midway between light source array 300 and SLM 310. For simplicity, input lens 306 is shown schematically as a single lens element, but input lens 306 is preferably a lens array including a separate lens element for each separate light source in light source array 300. Accordingly, if the light source array 300 is a two-dimensional array of light sources, then input lens 306 is preferably a corresponding two-dimensional array of lenses, with the number of lens systems in lens array 306 being equal to the number of separate light sources in array 300.

During a first time interval in a display cycle, light source 301 is enabled, and a first set of control signals are applied to SLM 310 to create a first modulated image, which is received by output lens 314, and passed to secondary output lens 316 for producing a first image 318. During a second time interval, light source 302 is enabled, and a second set of control signals are applied to SLM 310 to create a second modulated image, which is received by output lens 314, and passed to secondary output lens 320 for producing a second image 322. Similarly, during a third time interval, light source 303 is enabled, and a third set of control signals are applied to SLM 310 to create a third modulated image, which is received by output lens 314, and passed to secondary output lens 324 for producing a third image 326. Each of secondary output lens elements 316, 320 and 324 may have a focal length $f_2$ equal to focal length $f_2$ of output lens 314. In this case, output lens 314 is disposed midway between SLM 310 and secondary output lens elements 316, 320 and 324. In turn, secondary output lens elements 316, 320 and 324 are disposed midway between output lens 314 and the image plane 330 in which the first image 318, second image 322 and third image 326 are produced. As in the case of input lens 306, output lens 314 may actually be a lens array including a separate lens element for each separate light source in light source array 300. Accordingly, if the light source array 300 is a two-dimensional array of light sources, then output lens 314 could be a corresponding two-dimensional array of lenses. Similarly, the number of secondary output lens elements 316, 320 and 324 may also be equal in number, and configuration, to the light sources in light source array 300.

The three resulting images 318, 322 and 326 formed within image plane 330 are all created by a single SLM 310, and collectively create a resulting tiled image that is three times larger than an image produced by SLM 310 at any given moment in time. If light source array 300 is a 3×3 two-dimensional array of such light sources, then a display cycle would include at least nine such time intervals (one for each of the nine light sources), and the collective image produced at image plane 330 by tiling together nine such images in a 3×3 output array would be nine times the size of an image produced by SLM 310 at any given moment in time. This high resolution multiplexed image could then be magnified to another image plane or viewing screen with the use of a projection lens.

Figure 8:
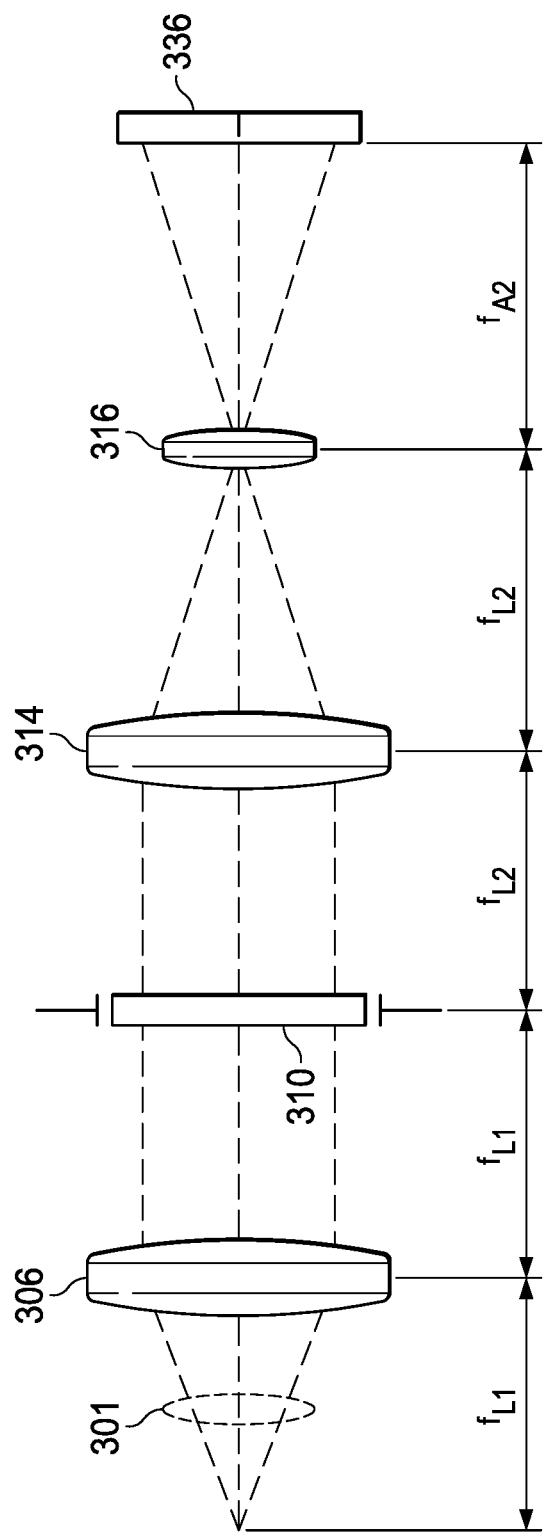
FIG. 8 is a basic design layout drawing that illustrates relationships between a light source and the SLM, and the focal lengths of the associated optics.

FIG. 8 is a graphic illustration of the relative positioning of the light source elements, optical components and SLM when practicing the method shown in FIG. 7. In FIG. 8, only a single light source 301 is shown for simplicity. Input lens 306 has a focal length $f_1$, and input lens 306 is placed at a distance of $f_1$ from light source element 301. SLM 310 is likewise placed at a distance of $f_1$ from input lens 306. Output lens 314 has a focal length of $f_2$, and output lens 314 is placed at a distance of $f_2$ from SLM 310. Secondary output lens 316 has the same focal length $f_2$ as output lens 314, and is placed at a distance of $f_2$ from output lens 314.

If the linear height of light source element 301 is represented by the letter h, and if the linear height of the resulting image created at second output lens 316 is represented by h', then magnification ($m_{source}$) of the image produced at the secondary output lens 316 (h') relative to the original size (h) of the light source is expressed as:

$$m_{source} = h'/h = f_2/f_1$$

If a further output lens (e.g., a projection lens represented in FIG. 8 by 336) is provided to project the image focused by secondary output lens 316, and if the projection lens 336 has a focal length $f_3$, then magnification ($m_{DMD}$) of the projected image as compared to the original image size produced by SLM 310 is expressed as:

$$m_{DMD} = f_3/f_2$$

FIG. 9 is a graphic illustration similar to FIG. 8, but expanded to show a 2×2 two-dimensional array of light sources, and a resulting 2×2 array of resulting light images. In FIG. 9, two of four light sources are shown as 301 and 302. Referring to FIG. 10A, and viewing the light source array 300 head-on, a total of four light sources, 301, 301', 302 and 302' are arranged in a 2×2 array. In FIG. 9, light source 301' is hidden behind light source 301, and light source 302' is hidden behind light source 302. During a first time interval, light source 301 is enabled, and input lens 306 directs such light at SLM 310 to produce a selected image, which is passed by output lens 314 to secondary output lens 316 and then to projection lens 336 to produce patterned image 318. FIG. 10B shows patterned image 318 in the lower-right corner of a tiled 2×2 image array 340. During a second time interval, light source 301' is enabled, and the process is repeated to produce a second patterned image 318', which is shown in the lower-left corner of FIG. 10B. During a third time interval, light source 302 is enabled, and a third patterned image 322 is produced, as shown in the upper-right corner of FIG. 10B. During a fourth time interval, light source 302' is enabled, and a fourth image 322' is produced, as shown in the upper-left corner of FIG. 10B.

Figure 1:
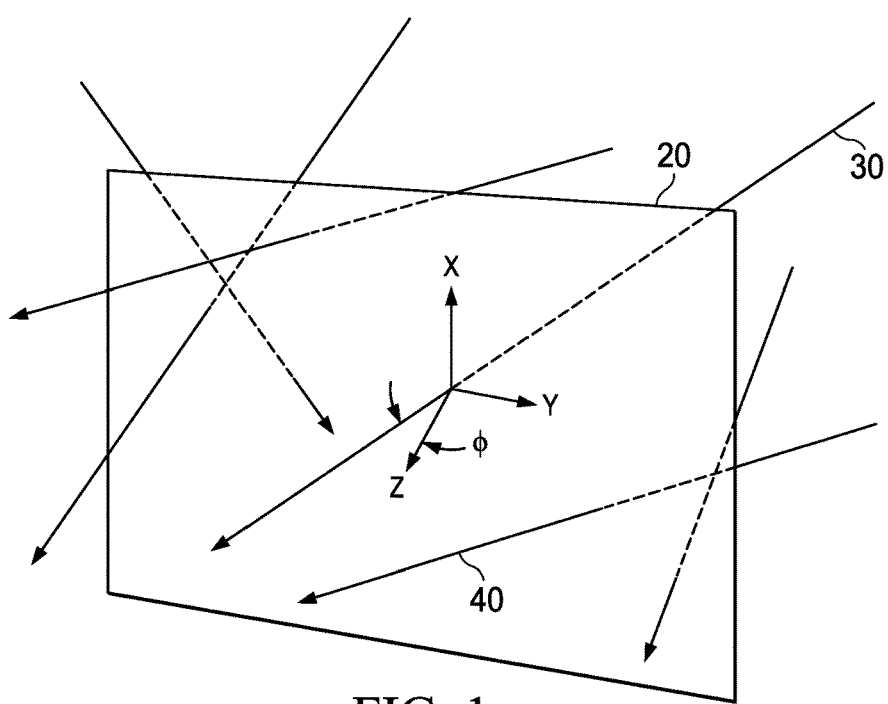
FIG. 1 (prior art) graphically depicts rays of light emitted from a light field.

FIGS. 1 and 2 illustrated the concept of a light hogel formed by a group of light rays exiting from a point source, where each such light ray has its own angular direction and intensity (and preferably its own color). The hogel "pitch" was defined as the distance separating adjacent hogels. As more rays of light exit each hogel, the resulting 3D image has a higher definition. Likewise, as the hogel pitch becomes smaller, the resulting 3D image has a higher definition.

Figure 11A:
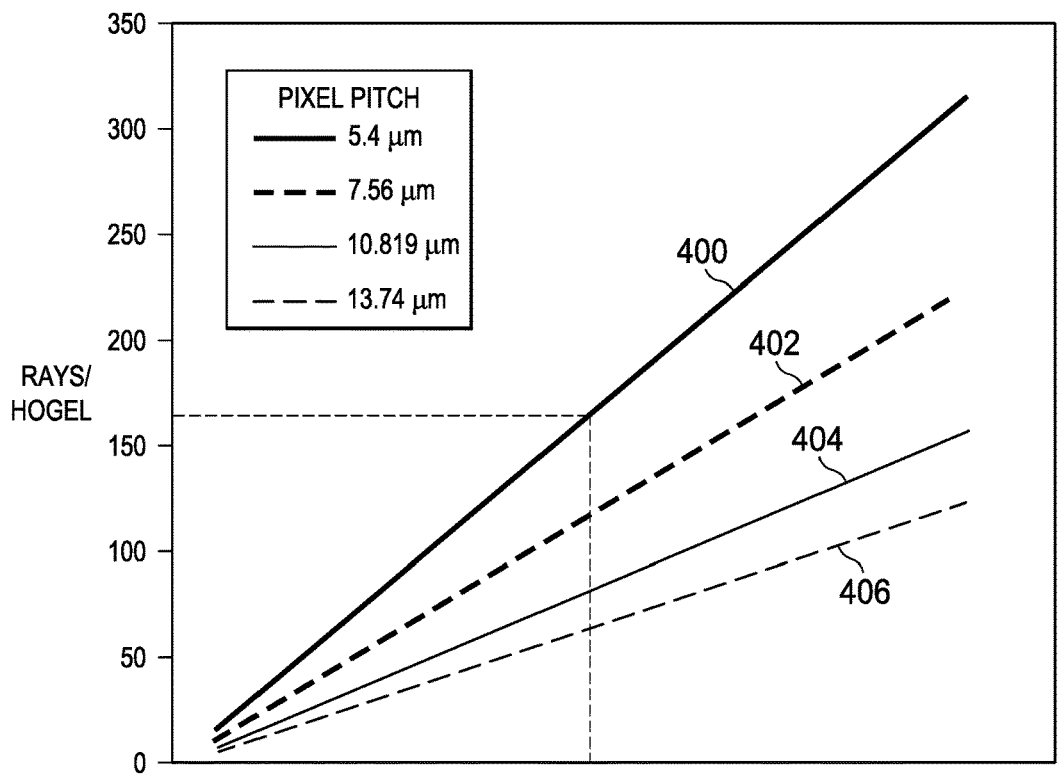
FIG. 11A is a graph of a relationship between a number of light rays per hogel and various DMD pixel pitches of the SLM images.

FIG. 11A is a graph that relates the number of rays emitted by each hogel to the pixel pitch of the SLM being used. Generally, as the pixel pitch of the SLM becomes smaller, more rays of light will be emitted by each hogel. In FIG. 11A, solid line 400 shows the number of light rays emitted per hogel when the SLM pixels are spaced at a pitch of 5.4 micrometers. In FIG. 11A, dashed line 402 shows the comparative number of light rays emitted per hogel when the SLM pixels are spaced at a pitch of 7.55 micrometers. Dashed line 404 shows the comparative number of light rays emitted per hogel when the SLM pixels are spaced at a pitch of 7.55 micrometers. Finally, dashed line 406 shows the comparative number of light rays emitted per hogel when the SLM pixels are spaced at a pitch of 13.74 micrometers.

Figure 11B:
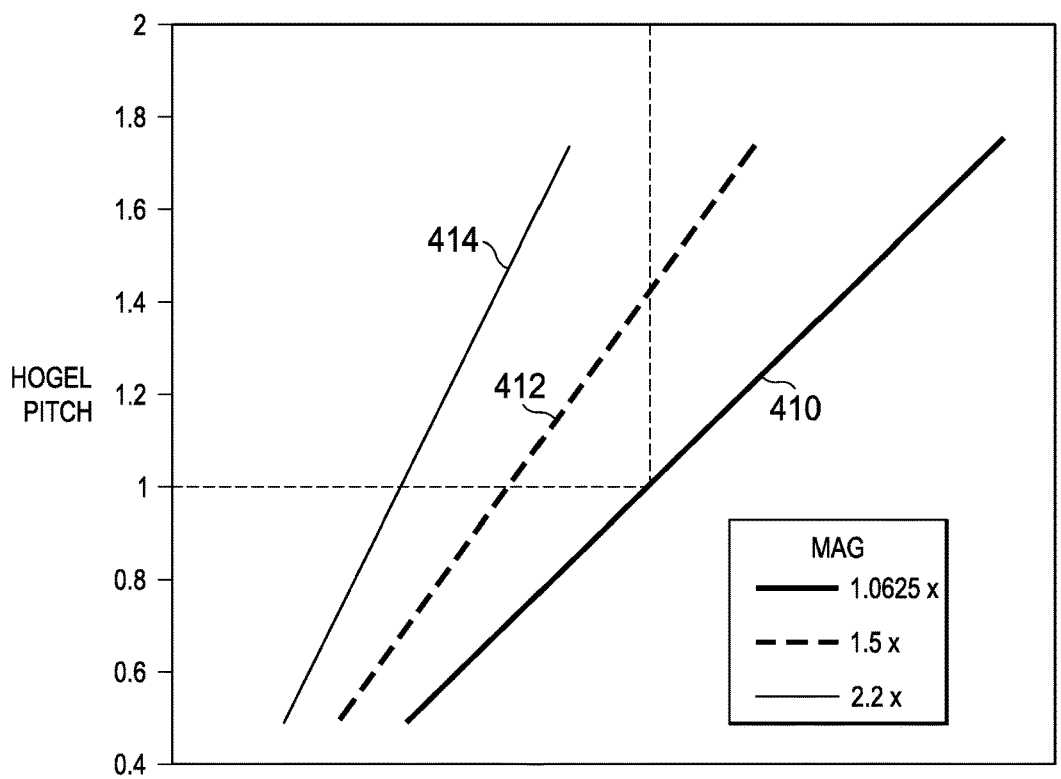
FIG. 11B is a graph of a relationship between hogel pitch (i.e., spacing between adjacent hogels) and various magnification ratios of the SLM images.

FIG. 11B graphically illustrates the relationship between magnification ratios and hogel pitch. In FIG. 11B: solid line 410 represents a small degree of image magnification of 1.0625 times; dashed line 412 represents a larger image magnification of 1.5 times; and dashed line 414 represents an even larger image magnification of 2.2 times. As image magnification increases, the hogel pitch also increases, resulting in a lesser quality 3D image.

Figure 12:
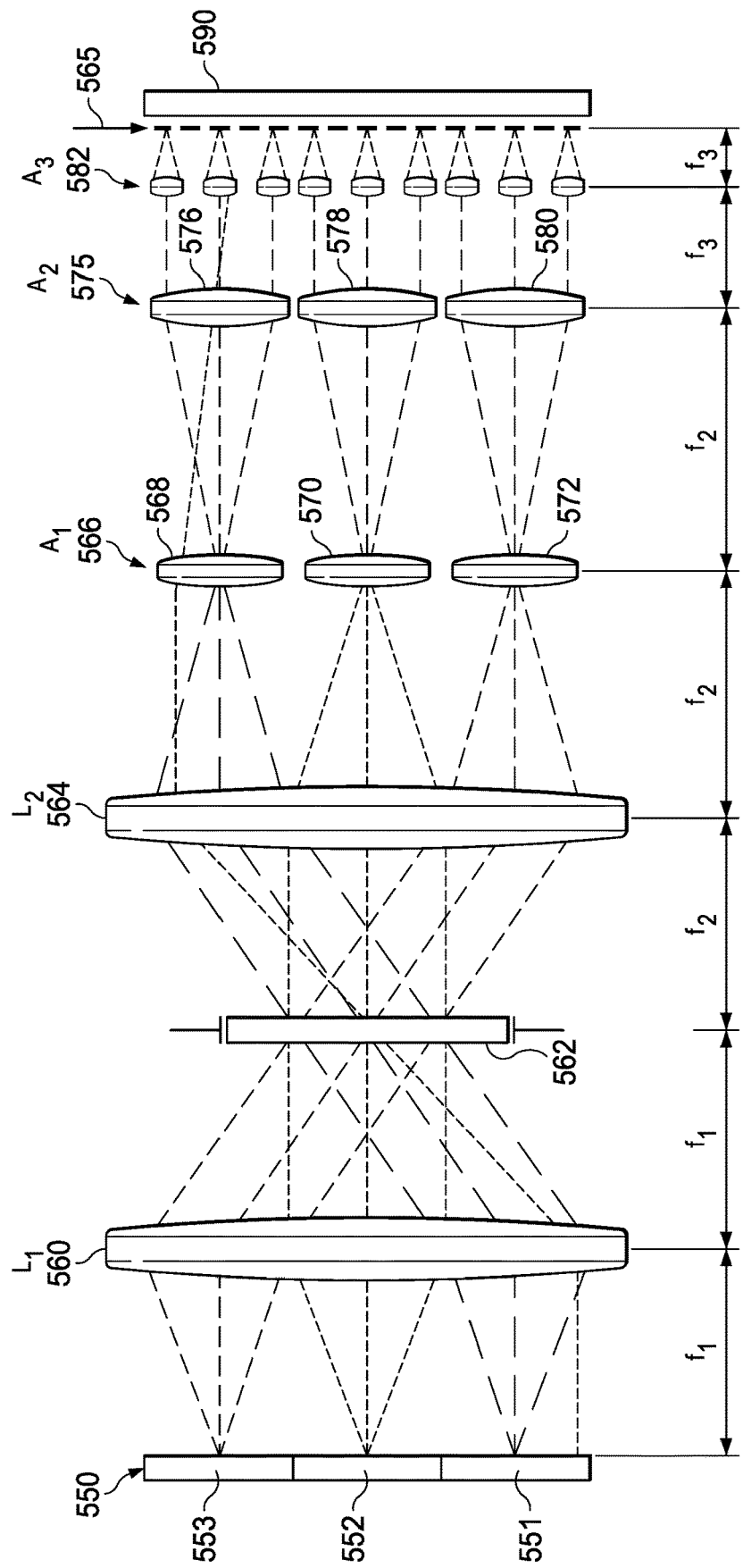
FIG. 12 is a schematic drawing related to FIG. 4, but adding additional lens elements to further multiply the number of hogels produced in the hogel plane by a single SLM.

FIG. 12 shows an alternate embodiment of the method described hereinabove in connection with FIG. 6. Light source array 500 is shown schematically as including light sources 501, 502 and 503 arranged in a one-dimensional linear array. Light source array 500 may also be configured as a two-dimensional array of light sources. A first input lens system 560 focuses each light source, one-at-a-time, upon SLM 562. Output lens system directs patterned light images produced by SLM 562 to lens array 566, which includes lens elements 568, 570 and 572. The patterned images passing through lens array 566 are directed toward lens array 575, including lens elements 576, 578 and 580. The light rays passing through lens array 575 are directed generally parallel to the central axes of lens elements 576, 578 and 580, before being intercepted by yet another lens array 582. Lens array 582 corresponds generally to lens array 222 in FIG. 5. Lens array 582 includes 3 smaller lenses for each lens element in lens array 575, thereby creating three light hogels in hogel plane 565 for each patterned image created by SLM 562 during a given time interval of a display cycle. An optional mask (not shown), with patterned apertures formed at the hogel locations, may be provided at hogel plane 565 to filter unwanted stray light. If desired, far field/angle space expander optics 590 may be provided just beyond the hogel plane to expand the angles of the light rays leaving each hogel.

The method of FIG. 12 creates, in essence, a display having at least 9-times or more of the native resolution of SLM 562, partly because of the multiplexing of SLM 562 and light source array 550, and partly because of the optic lens array 582. The multiple images of SLM 562 (created at lens array 575) create a high density of pixels (a multiple of the number of light sources in light source array 550 multiplied by the number of pixels in single SLM 562), which are then used by lens array 582 to create the hogels at the hogel plane. This image multiplexing technique has several advantages, because it can create a high pixel density required for a light field display, it creates multiple hogels at one time, and it lowers the number of SLMs required in the system, potentially reducing cost and energy use.

Figure 13:
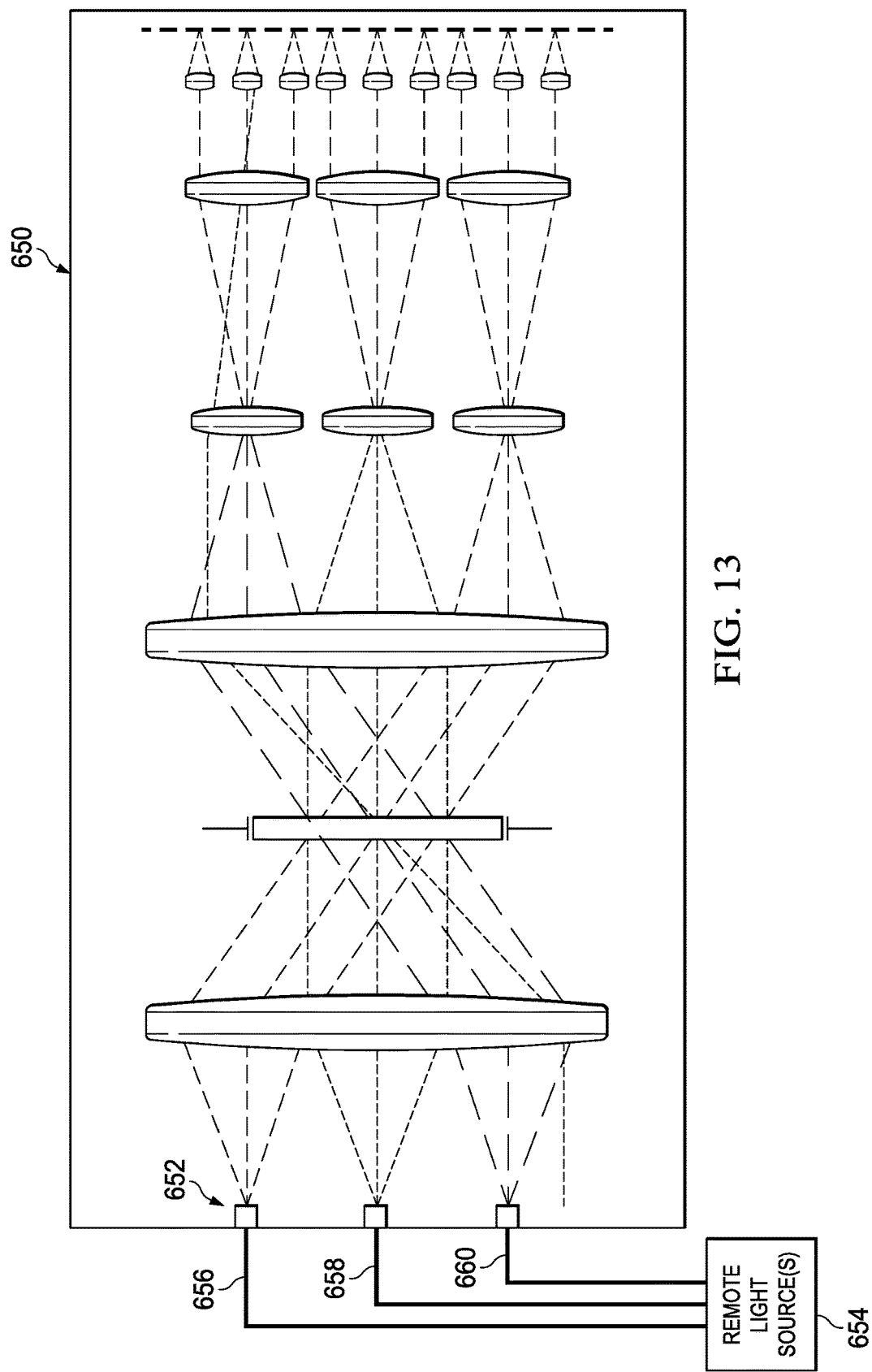
FIG. 13 is a schematic drawing that shows optical coupling of remote light sources, using fiber optic paths, to a 3D display system.

FIG. 13 illustrates a method for efficiently driving a light source array of the type described hereinabove. FIG. 13 depicts a display system 650 ("light hogel generator") for generating light hogels from an SLM, of the type generally described hereinabove in connection with FIG. 12. However, in system 650, light source array 652 is actually an array of light switches, or light emitting ports, which selectively pass light received from another source. The actual source of the light is not housed within system 650. As a result, the actual light sources, and the power supplies for such actual light sources, can be located elsewhere. FIG. 13 shows a remote light source 654, having its own power source and light source(s). In one embodiment of FIG. 13, remote light source 654 is capable of sourcing three different-colored lights (e.g., red, green and blue) over three fiber optic pathways, or waveguides, 656, 658, and 660 to system 650. The simplified drawing of FIG. 13 shows only three fiber optic paths (656-660), but the actual number of such fiber optic paths may be increased to equal the number of light emitting ports within the array 652 housed in system 650, so each optic fiber is connected to one light emitting port within array 652. The light sources housed within remote light source 654 can be any type of light source, such as LED, laser, laser/phosphor or high-intensity discharge lamp. Moreover, remote light source 654 has been described as generating three fixed output colors (e.g., red, green and blue), but each such fiber optic channel may also be useful to carry time-multiplexed colors. Likewise, three separate fiber optic paths 656, 658 and 660 have been illustrated, but a single fiber optic channel may also be useful to provide time-multiplexed light sources of different colors. Light colors are not limited to red, green and blue primary colors, but could also contain cyan, magenta, and yellow (C,M,Y) or any combination or spectra in between, so long as the desired color requirements of the final multiplexed images are met.

As mentioned hereinabove, array 652 in system 650 does not include its own source of light, but instead passes or blocks light received from the remote source 654. One way of providing such a switchable array of light emitting ports is by providing a separate, second SLM within array 652. The pixels of such second SLM are subdivided into an array of rows and columns, and the subdivided portions of the second SLM are sequentially operated to direct light to the first SLM over each of the time intervals of a display cycle. The light from the remote source is directed at the second SLM. In at least one example, the second SLM is divided into a 4×4 array, for a total of 16 regions. These 16 regions are separated selected in time-sequenced fashion, so that only one of the 16 regions emits light over a corresponding time interval.

By locating the actual light sources remotely from the 3D image projection system or other optical hardware, the 3D image projection system itself requires less space, and avoids a requirement to remove heat produced by light sources. Also, only one light hogel generator 650 is shown in FIG. 13, but remote light source 654 could be optically coupled to two or more of such light hogel generators to provide light to all of such light hogel generators simultaneously.

Figure 14:
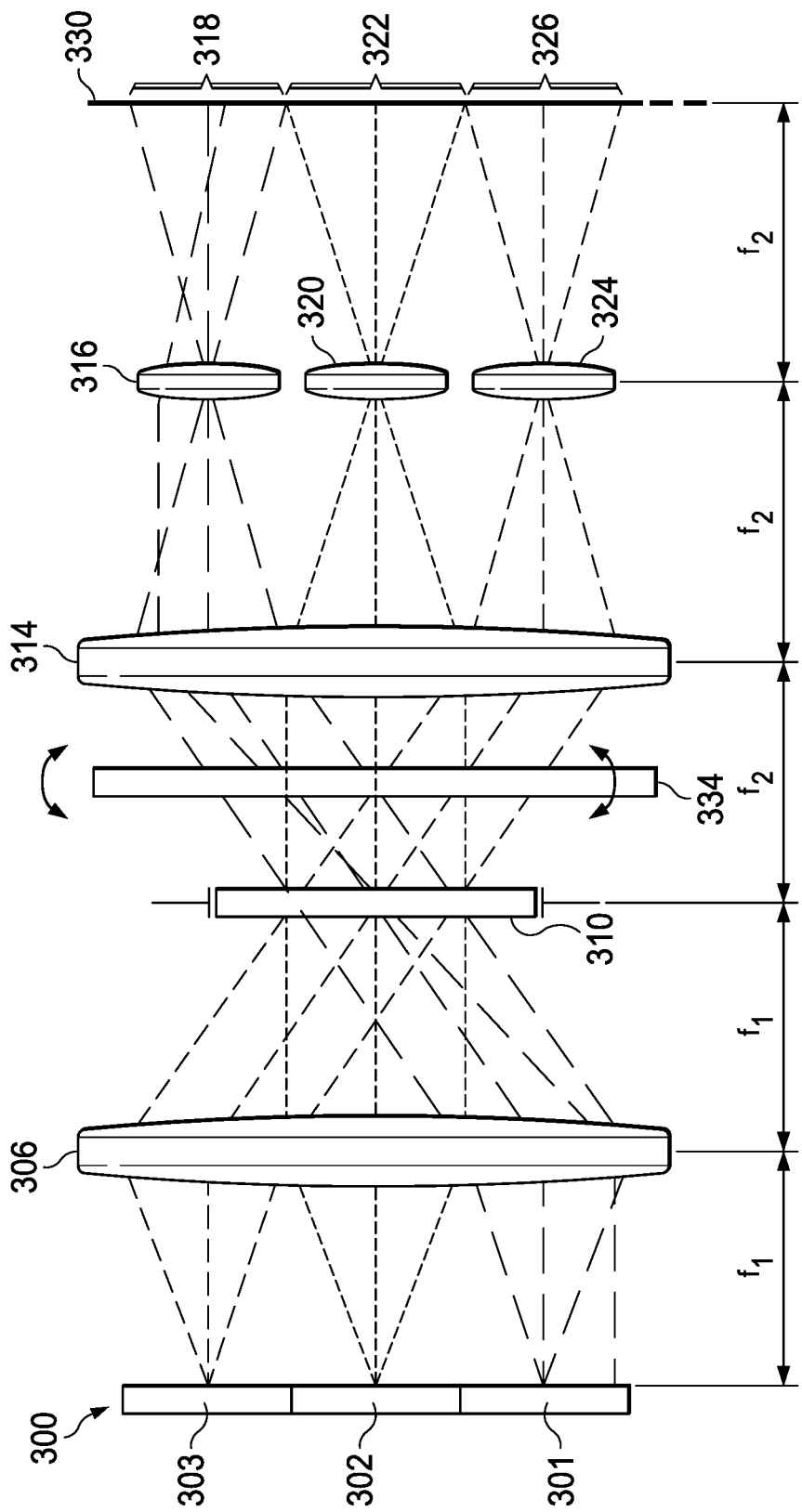
FIG. 14 is a schematic drawing similar to FIG. 7, but adding a glass plate that can be tilted to shift the image created by the SLM by one-half of a pixel.
Figure 15A:
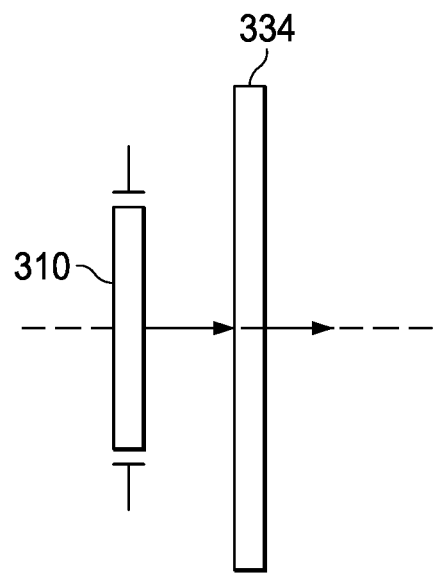
FIG. 15A is a schematic drawing that shows light passing through the glass plate of FIG. 14 when the glass plate is disposed parallel to the SLM.
Figure 15B:
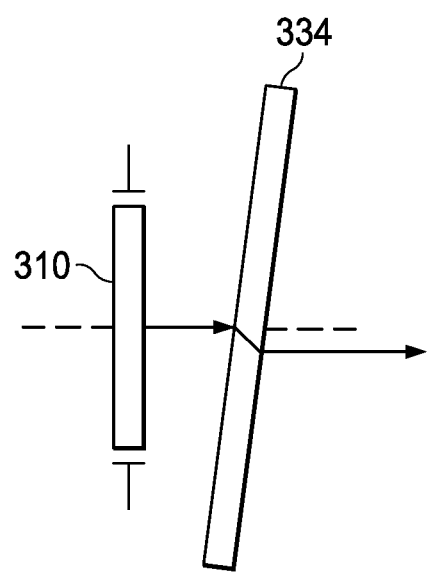
FIG. 15B is a schematic drawing similar to FIG. 15A, but with the glass plate tilted at an angle to the SLM.

FIG. 14 illustrates an alternate embodiment of the method generally described hereinabove relative to FIG. 7, and like components have been labeled with like reference numerals. In the embodiment of FIG. 14, a tiltable glass plate 334 is interposed between SLM 310 and lens array 314. As shown in FIG. 15A, glass plate 334 does not alter the image produced by SLM 310 if glass plate 334 lies parallel to SLM 310 (i.e., perpendicular to the optical axis). However, if glass plate 334 is tilted to lie at an angle to SLM 310, then rays of light passing through glass plate 334 are refracted internally as they pass from the front face to the opposing rear face of glass plate 334. While such light rays enter glass plate 334 and exit glass plate 334, parallel to the optical axis, the exiting light rays are shifted positionally, thereby producing a spatially-shifted image as shown in FIG. 15B. This spatial shifting effectively allows for the creation of additional images that are offset by one-half pixel. SLM 310 can be controlled to produce a first image before glass plate 334 is tilted, and a second image after glass plate 334 is tilted, thereby providing twice the number of images that can be multiplexed. Moreover, glass plate 334 can be tilted in two different (x-y) axes relative to SLM 310, effectively allowing up to four additional spatially-separated images when glass plate 334 is tilted apart from the image provided when glass plate 334 is not tilted.

Figure 16:
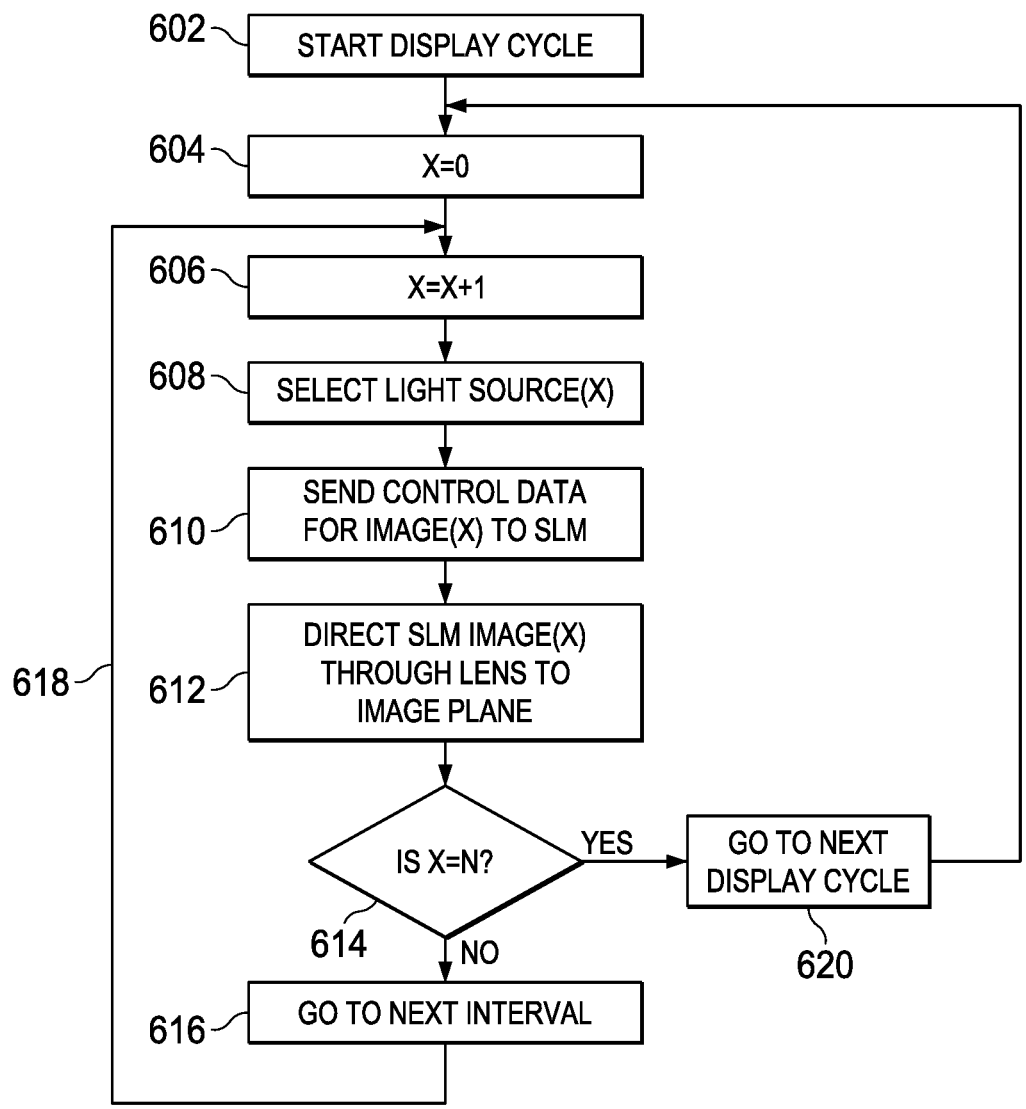
FIG. 16 is a flowchart of a method for forming images at an image plane using a multiplexed light source array and a single SLM.

FIG. 16 is a simplified flowchart of the method of providing 3D display images performed by the components of FIG. 7. Box 602 designates the beginning of a display cycle. At box 604, interval counter X is reset to zero. At box 606, interval counter X is incremented; on the first occasion of reaching box 606, interval counter X is incremented to the number "1" for indicating the first time interval. At box 608, the first light source in the light source array is selected and enabled; with respect to the components of FIG. 7, light source 301 of light source array 300 is selected and enabled at this time. At box 610, control data for producing a first SLM image on SLM 310 (see FIG. 7) is transmitted to SLM 310 via a controller. Box 612 designates directing the SLM image for the current time interval through a lens (e.g., lens 316 in FIG. 7) to recreate the SLM image within a portion 318 of the image plane 330. Decision box 614 in FIG. 16 determines whether the interval counter X has already reached N, where N is the total number of intervals in a complete display cycle. Typically, N is also the number of distinct light source elements (301, 302, 303) in the light source array (300); in the case of the simplified display system of FIG. 7, N equals three. If time interval counter X has not yet reached N, then control passes through box 616 to advance to the next time interval of the current display cycle; as indicated by arrow 618, control is returned to box 606, the time interval counter X is incremented, and steps 608-614 are repeated for the next light source in the array. However, if box 614 determines that the time interval counter X equals N, then control passes through box 620 to begin a new display cycle; the time interval counter X is reset to zero, and steps 606 through 614 are repeated.

Figure 17:
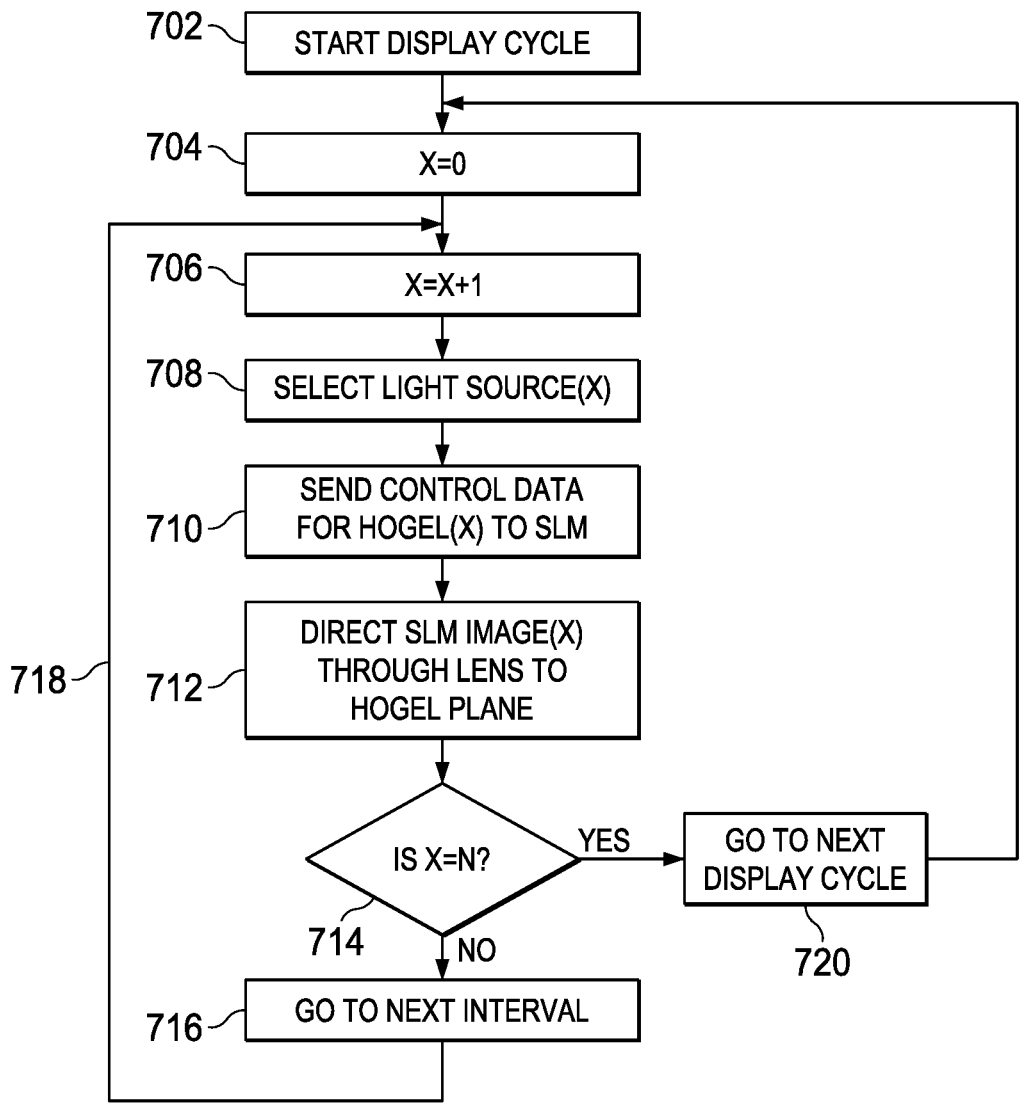
FIG. 17 is a flowchart of a method for forming light hogels in a hogel plane using a multiplexed light source array and a single SLM.

FIG. 17 is a simplified flowchart of the method of providing 3D light hogels performed by the components of FIG. 6. Box 702 designates the beginning of a display cycle. At box 704, interval counter X is reset to zero. At box 706, interval counter X is incremented; on the first occasion of reaching box 706, interval counter X is incremented to the number "1" for indicating the first time interval. At box 708, the first light source in the light source array is selected and enabled; with respect to the components of FIG. 6, light source 251 of light source array 250 is selected and enabled at this time. At box 710, control data for producing a first SLM image on SLM 262 (see FIG. 6) is transmitted to SLM 262 via a controller. This first SLM image is used to create a first light hogel. Box 712 designates directing the SLM image for the current time interval through a lens (e.g., lens 264 in FIG. 6) to create a light hogel within a portion of the hogel plane 265. Decision box 714 in FIG. 17 determines whether the interval counter X has already reached N, where N is the total number of intervals in a complete display cycle. Typically, N is also the number of distinct light source elements (251-259) in the light source array (250); in the case of the simplified display system of FIG. 6, N equals nine. If time interval counter X has not yet reached N, then control passes through box 716 to advance to the next time interval of the current display cycle; as indicated by arrow 718, control is returned to box 706, the time interval counter X is incremented, and steps 708-714 are repeated for the next light source in the array. However, if box 714 determines that the time interval counter X equals N, then control passes through box 720 to begin a new display cycle; the time interval counter X is reset to zero, and steps 706 through 714 are repeated.

Figure 18:
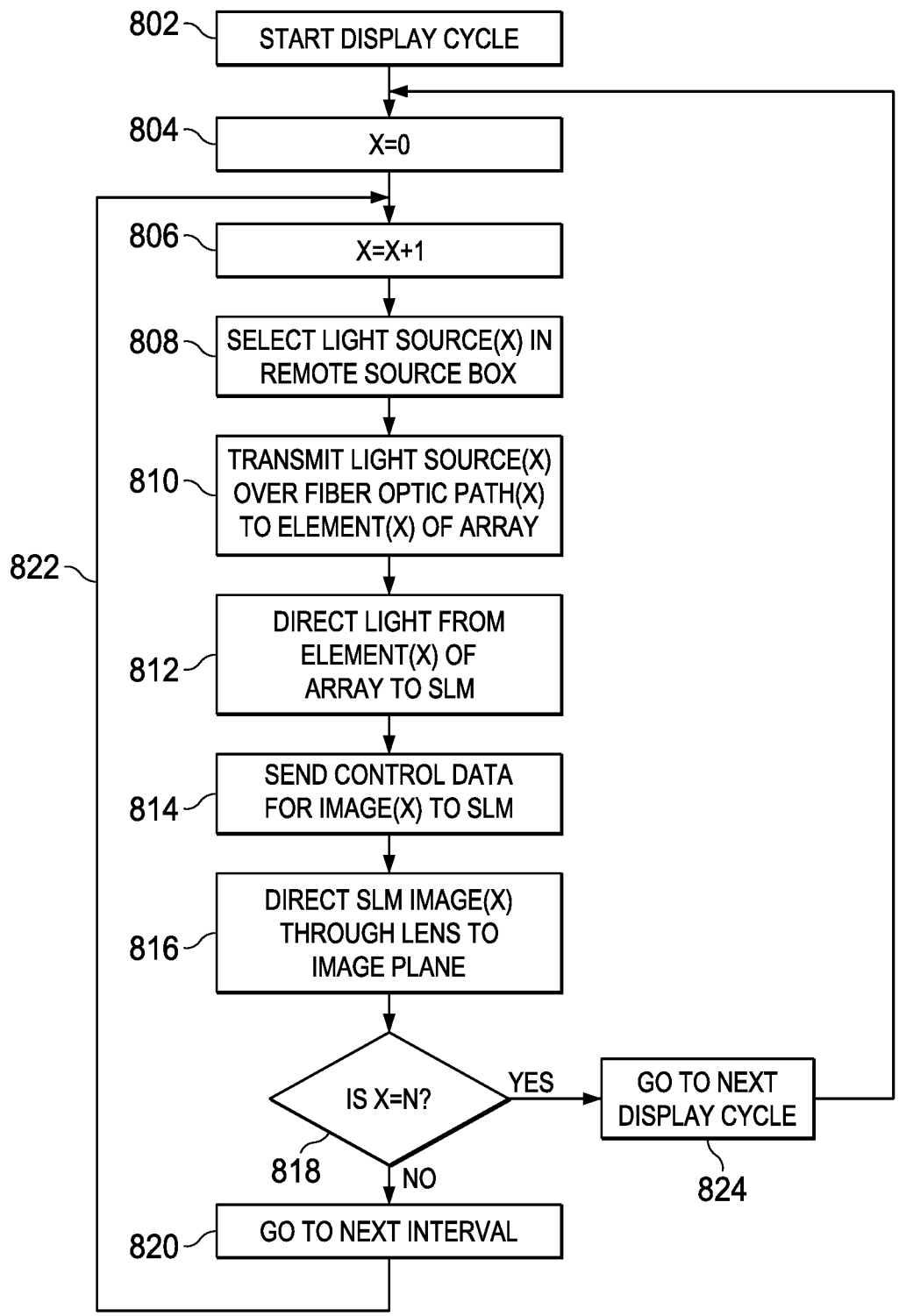
FIG. 18 is a flowchart of a method for remotely sourcing light over fiber optic pathways to an array of light ports in multiplexed fashion for forming images at an image plane using a single SLM.

FIG. 18 is a simplified flowchart of the method of providing a 3D display using light sources located remotely from the 3D display enclosure, such as performed by the components of FIG. 13. Box 802 designates the beginning of a display cycle. At box 804, interval counter X is reset to zero. At box 806, interval counter X is incremented; on the first occasion of reaching box 806, interval counter X is incremented to the number "1" for indicating the first time interval. At box 808, the first light source in the remote light source (654 in FIG. 13) is selected and enabled. At box 810, light from the first light source in remote light source 654 is transmitted over a first fiber optic path (656 in FIG. 13) to a first light emitting element of array 652 of display system 650. At box 812, light passed by first light emitting element of array 652 is directed at the SLM of display system 650. At box 814 of FIG. 18, control data for producing a first SLM image on the SLM of display system 650 is transmitted thereto via a controller. This first SLM image might be used to create a first image within a portion of the image plane of display system 650. Box 816 designates directing the SLM image for the current time interval through a lens to create such first display image within a portion of the image plane produced by display system 650. Decision box 818 in FIG. 18 determines whether the interval counter X has already reached N, where N is the total number of intervals in a complete display cycle. N may also be the number of distinct fiber optic paths (656, 658, 660) coupled between remote light source 654 and the light emitting array of display system 650. N may also correspond to the number of light emitting ports in array 652 of display system 650; in the case of the simplified display system of FIG. 13, N equals three. If time interval counter X has not yet reached N, then control passes through box 820 to advance to the next time interval of the current display cycle; as indicated by arrow 822, control is returned to box 806, the time interval counter X is incremented, and steps 808-818 are repeated for the next time interval. However, if box 818 determines that the time interval counter X equals N, then control passes through box 824 to begin a new display cycle; the time interval counter X is reset to zero, and steps 806 through 818 are repeated.

The method of producing high quality 3D images described hereinabove is a fundamental, core technology useful for any application where a higher pixel density is required from an image of the SLM. Two examples where such method may be applied are in the field of 3D printing, and in the field of high quality cinema projection.

Accordingly, example embodiments include a method for dynamically creating a relatively large number of pixels required for a high quality 3D display system, while reducing the number of required SLMs. Example embodiments allow for production of a high resolution light field including an array of light hogels, and/or high resolution 3D display, with fewer SLMs, at reduced cost. Moreover, by using remotely located light sources, high intensity light sources are not integrated within the same housing that contains the electro-optical system for generating 3D images, while allowing such light sources to be shared efficiently among two or more 3D display systems.

The method also includes providing a number of spatially-separated lenses, equal in number to the number of separate light sources. Preferably, the lenses are configured in the same one-dimensional, or two-dimensional pattern, as their corresponding light sources. Each such lens receives the predetermined light image produced by the spatial light modulator during the time interval when its corresponding light source has been selected, and directs the received light image toward an image plane. During each time interval, at least one such light image is directed at a corresponding portion of the image plane. The number of such light images corresponds to the number of light sources selected during that time interval. Over the course of a number of time intervals (collectively, a display cycle), each of the light sources is selected at least once, and each lens directs a predetermined light image toward a portion of the image plane. The overall image produced during the complete display cycle can therefore be much larger than the image produced by the spatial light modulator during any single time interval. Moreover, because the array of light sources and the control signals to the SLM may be switched at a high rate of speed, each display cycle can be relatively short.

In practicing this method, the selection of the light source, or sources, that is/are active during a particular time interval is synchronized with control signals applied to the spatial light modulator for producing a unique light image corresponding to the location, within the array of light sources, of the selected light source(s). The spatial light modulator provides a predetermined number of pixels during each time interval, when the spatial light modulator is illuminated by a selected light source. The spatial light modulator provides a cumulative total of pixels during each display cycle, equal to the number of light sources within the light source array, multiplied by the predetermined number of pixels provided during each time interval by the spatial light modulator. If desired, the cumulative image directed at the image plane may be provided to a projection lens for being magnified and projected to form a high resolution image on a display surface, or on a work surface.

Methods of example embodiments may use conventional SLMs, such as LCDs, LCoS and digital micromirror devices. Moreover, each of the spatially-separated light sources may be adapted to provide different colors at different times. In this case, each such light source may be operated to provide light of a first color during one time interval and light of a second color during a second time interval, and so on, to create a full-color image corresponding to each light source.

In accordance with an alternative embodiment of a method of creating light hogels within a light field display, a number of spatially-separated light sources (which may be provided as a linear array or a two-dimensional array) are provided in conjunction with a spatial light modulator. Each light source is alternately selected in multiplexed fashion to be operable during a corresponding interval of time. If desired, two or more light sources may be selected during the same time interval if the light hogels they are to produce share the same image pattern. Light emitted from the selected light source(s) is directed at the spatial light modulator, preferably by a lens disposed between the light source array and the spatial light modulator. The spatial light modulator is controlled to provide a predetermined pattern of light rays during each such time interval. A lens is provided between the spatial light modulator and a hogel plane for receiving the predetermined light rays emitted by the spatial light modulator during each time interval, and for focusing the received rays of light onto the hogel plane to provide a predetermined light hogel during each such time interval. This predetermined light hogel has a location within the hogel plane that corresponds to the location of the light source(s) within light source array selected during the corresponding time interval. Over the course of a number of time intervals collectively forming one display cycle (where such number of time intervals is, at most, equal to the number of separate light sources in the light source array), a corresponding number of light hogels are provided along the hogel plane over the display cycle.

If desired, methods of example embodiments include providing a mask with an array of apertures at the hogel plane. These apertures permit light rays to pass therethrough, while reducing passage of stray light. Also, they define the dimensions of each light hogel.

In practicing methods of example embodiments, the control of the spatial light modulator is synchronized with the selection of each of the light sources to generate a desired light pattern for each light source. For example, the spatial light modulator may be an LCD, LCoS or digital micromirror device SLM. If the light source array is provided as a two-dimensional array, then the SLM and lens will provide light hogels within the hogel plane in a corresponding two-dimensional pattern. If each light source in the light source array is adapted to provide different colors at different times, then each light source may be operated to provide light of a first color during one time interval and light of a second color during a second time interval, and so on, to generate full-color light hogels in the hogel plane.

In accordance with another example embodiment of a method of creating an array of spatially-separated light source elements for driving a spatial light modulator, the method includes: providing two or more remote sources of high intensity light in a first physical location; providing an array of spatially-separated light emitting ports at a second physical location relatively remote from the first physical location; and optically coupling the remote sources of light to the array of spatially-separated light emitting ports. A spatial light modulator is provided at the second physical location for receiving light from a selected light emitting port. The method includes selecting a first of the remote sources of light at the first physical location during a predetermined time interval, conveying the selected first source of light to the array of light emitting ports, enabling one of the light emitting ports to emit the selected first source of light during such respective time interval, and directing light emitted by the enabled light emitting port at the first spatial light modulator to create a modulated light image during such respective time interval.

Thereafter, a second of the remote sources of light is selected during a predetermined time interval, and the selected second remote source of light is conveyed to the array of light emitting ports. One of the light emitting ports is selected to emit the selected second remote source of light during a respective time interval, and the light emitted by the enabled light emitting port is directed at the spatial light modulator to create a modulated light image during such respective time interval.

In practicing the aforementioned method, the optical coupling of the remote light sources to the array of light emitting ports is preferably accomplished by providing optical fiber paths between the first physical location and the second physical location. For example, three fiber optic paths may be provided, each being capable of conveying a specific color (e.g., red, green, or blue); alternately, each such fiber optic path may transmit time-multiplexed colors (e.g., red, green and blue over successive time intervals). For example, these remote light sources can be laser light sources, LED light sources, or a high intensity broad frequency spectrum lamp selectively filtered by a color wheel. Control signals are preferably coupled between the first physical location and the second physical location for synchronizing the array of light emitting ports and the spatial light modulator at the second physical location with the selection of the remote sources of light provided at the first physical location.

Advantageously, by using such a remote light source at the first physical location, the light generated thereby may be shared among two or more 3D display systems. Another benefit is that the 3D display systems driven by such remote light sources may be more physically compact, use less power, and require less cooling, as compared with 3D display systems using localized light sources.

Modifications are possible in the described embodiments, and other embodiments are possible, within the scope of the claims.

What is claimed is:

1. A method of using a spatial light modulator to create multiple light images over a display cycle, the display cycle being divided into a plurality of time intervals, the method comprising:
   providing a plurality of spatially-separated light source elements;
   alternately selecting at least one of the plurality of spatially-separated light source elements to be operable during a corresponding time interval;
   directing light from the selected at least one light source element at the spatial light modulator;
   controlling the spatial light modulator to emit a predetermined light image during each time interval; and
   providing a plurality of spatially-separated lenses equal in number to the number of light source elements within the plurality of spatially-separated light source elements, each of the spatially-separated lenses receiving the predetermined light image emitted by the spatial light modulator during a corresponding time interval;
   wherein the plurality of lenses provide a corresponding plurality of light images along an image plane over a plurality of time intervals in each display cycle, while providing at least one light image during any particular time interval.

2. The method of claim 1, further comprising: synchronizing the selection of the plurality of spatially-separated light source elements with controlling the spatial light modulator.

3. The method of claim 1, wherein the spatial light modulator provides a predetermined number of pixels for each light source element during each time interval, and wherein the spatial light modulator provides a cumulative total of pixels during each display cycle equal to the number of light source elements multiplied by the predetermined number of pixels.

4. The method of claim 1, further comprising: providing a projection lens for receiving the plurality of light images provided along the image plane, magnifying the plurality of light images, and projecting the plurality of light images to form a high resolution image on a display surface.

5. The method of claim 1, further comprising: providing a projection lens for receiving the plurality of light images provided along the image plane, magnifying the plurality of light images, and projecting the plurality of light images upon a work surface.

6. The method of claim 1, wherein the spatial light modulator is a digital micromirror device.

7. The method of claim 1, wherein the plurality of spatially-separated light source elements are arranged in a two-dimensional array.

8. The method of claim 7, wherein the plurality of spatially-separated lenses are arranged in a two-dimensional array.

9. The method of claim 1, further comprising: operating the plurality of spatially-separated light source elements to provide light of different colors during different time intervals.

10. The method of claim 1, further comprising:
    providing a transparent plate between the spatial light modulator and the plurality of spatially-separated lenses, the transparent plate having an index of refraction, the transparent plate being movable along a first axis between a first position relative to the spatial light modulator, and a second position relative to the spatial light modulator, for selectively refracting light rays passing from the spatial light modulator to the spatially-separated lenses;
    selecting at least one of the plurality of spatially-separated light source elements to be operable during first and second time intervals;
    directing light from the selected at least one light source element at the spatial light modulator during both the first and second time intervals;
    disposing the transparent plate at the first position during the first time interval, and controlling the spatial light modulator to emit a first group of light rays during the first time interval, for passage by the transparent plate with a lesser amount of refraction; and
    disposing the transparent plate at the second position during the second time interval, and controlling the spatial light modulator to emit a second group of light rays during the second time interval, for passage by the transparent plate with a greater amount of refraction.

11. The method of claim 10, wherein the transparent plate is also movable along a second axis relative to the spatial light modulator, the second axis lying orthogonal to the first axis.

12. The method of claim 1, further comprising:
    providing a mirror between the spatial light modulator and the plurality of spatially-separated lenses, the mirror being movable along a first axis between a first angular position relative to the spatial light modulator, and a second angular position relative to the spatial light modulator, for reflecting light rays passing from the spatial light modulator to the spatially-separated lenses;
    selecting at least one of the plurality of spatially-separated light source elements to be operable during first and second time intervals;
    directing light from the selected at least one light source element at the spatial light modulator during both the first and second time intervals;
    disposing the mirror at the first position during the first time interval, and controlling the spatial light modulator to emit a first group of light rays during the first time interval, for reflection by the mirror at a first angle; and disposing the mirror at the second position during the second time interval, and controlling the spatial light modulator to emit a second group of light rays during the second time interval, for reflection by the mirror at a second angle.

13. The method of claim 12, wherein the mirror is also movable along a second axis relative to the spatial light modulator, the second axis lying orthogonal to the first axis.

14. A method of creating light hogels within a light field display over a display cycle, the display cycle being divided into a plurality of time intervals, the method comprising:

providing a plurality of spatially-separated light source elements;

providing a spatial light modulator;

alternately selecting at least one of the plurality of spatially-separated light source elements to be operable during a corresponding time interval;

directing light from the selected at least one light source element at the spatial light modulator;

controlling the spatial light modulator to emit predetermined light rays during each time interval; and providing a lens element for receiving the predetermined light rays emitted by the spatial light modulator during a corresponding time interval, the lens element focusing received rays of light onto a hogel plane to provide a predetermined light hogel during each time interval, the predetermined light hogel having a location within the hogel plane corresponding to a location of the at least one light source element selected during a respective time interval;

wherein a plurality of light hogels are provided along the hogel plane over a plurality of time intervals in each display cycle, while providing at least one hogel during any particular time interval.

15. The method of claim 14, further comprising: providing a mask with a plurality of apertures at the hogel plane, the apertures permitting light rays to pass therethrough while reducing passage of stray light and defining dimensions of each light hogel.

16. The method of claim 14, further comprising: synchronizing the selection of the plurality of spatially-separated light source elements with controlling the spatial light modulator.

17. The method of claim 14, wherein the spatial light modulator is a digital micromirror device.

18. The method of claim 14, wherein the plurality of spatially-separated light source elements are arranged in a two-dimensional array.

19. The method of claim 18, wherein the plurality of light hogels provided along the hogel plane over each display cycle are arranged in a two-dimensional array corresponding to the two-dimensional array in which the plurality of spatially-separated light source elements are arranged.

20. The method of claim 14, further comprising: operating the plurality of spatially-separated light source elements to provide light of different colors during different time intervals.

21. The method of claim 14, further comprising: providing a lens element between the plurality of spatially-separated light source elements and the spatial light modulator to focus rays of light from the selected light source onto the spatial light modulator.

22. The method of claim 14, further comprising:

providing a transparent plate between the spatial light modulator and the lens element, the transparent plate having an index of refraction, the transparent plate being movable along a first axis between a first position relative to the spatial light modulator, and a second position relative to the spatial light modulator, for selectively refracting light rays passing from the spatial light modulator to the lens element;

selecting at least one of the plurality of spatially-separated light source elements to be operable during first and second time intervals;

directing light from the selected at least one light source element at the spatial light modulator during both the first and second time intervals;

disposing the transparent plate at the first position during the first time interval, and controlling the spatial light modulator to emit a first group of light rays during the first time interval, for passage by the transparent plate with a lesser amount of refraction; and disposing the transparent plate at the second position during the second time interval, and controlling the spatial light modulator to emit a second group of light rays during the second time interval, for passage by the transparent plate with a greater amount of refraction.

23. The method of claim 22, wherein the transparent plate is also movable along a second axis relative to the spatial light modulator, the second axis lying orthogonal to the first axis.

24. The method of claim 14, further comprising:

providing a mirror between the spatial light modulator and the lens element, the mirror being movable along a first axis between a first angular position relative to the spatial light modulator, and a second angular position relative to the spatial light modulator, for reflecting light rays passing from the spatial light modulator to the lens element;

selecting at least one of the plurality of spatially-separated light source elements to be operable during first and second time intervals;

directing light from the selected at least one light source element at the spatial light modulator during both the first and second time intervals;

disposing the mirror at the first position during the first time interval, and controlling the spatial light modulator to emit a first group of light rays during the first time interval, for reflection by the mirror at a first angle; and disposing the mirror at the second position during the second time interval, and controlling the spatial light modulator to emit a second group of light rays during the second time interval, for reflection by the mirror at a second angle.

25. The method of claim 24, wherein the mirror is also movable along a second axis relative to the spatial light modulator, the second axis lying orthogonal to the first axis.

26. A method of creating an array of spatially-separated light source elements for driving a spatial light modulator, the method comprising:

providing a plurality of sources of light in a first physical location;

providing an array of spatially-separated light emitting ports, the array of light emitting ports being provided at a second physical location relatively remote from the first physical location;

optically coupling the first physical location to the second physical location for conveying light from the plurality of sources of light to the array of spatially-separated light emitting ports;

selecting a first of the plurality of sources of light at the first physical location during a first time interval, conveying the selected first source of light to the array of light emitting ports, enabling one of the plurality of light emitting ports to emit the selected first source of light during the first time interval, and directing light emitted by the enabled light emitting port at the spatial light modulator to create a modulated light image during the first time interval; and selecting a second of the plurality of sources of light at the first physical location during a second time interval, conveying the selected second source of light to the array of light emitting ports, enabling one of the plurality of light emitting ports to emit the selected second source of light during the second time interval, and directing light emitted by the enabled light emitting port at the spatial light modulator to create a modulated light image during the second time interval.

27. The method of claim 26, wherein optically coupling the first physical location to the second physical location includes: providing a plurality of optical fiber paths between the first physical location and the second physical location.

28. The method of claim 26, further comprising: providing control signals from the first physical location to the second physical location for synchronizing the array of spatially-separated light emitting ports and the spatial light modulator with the plurality of sources of light provided at the first physical location.

29. The method of claim 26, wherein providing the plurality of sources of light in the first physical location includes providing laser light sources.

30. The method of claim 26, wherein providing the plurality of sources of light in the first physical location includes providing light emitting diodes.

31. The method of claim 26, wherein providing the plurality of sources of light in the first physical location includes providing a high-intensity lamp and a color wheel.

32. The method of claim 26, wherein the spatial light modulator is a first spatial light modulator, and the method further comprises:

providing a second array of spatially-separated light emitting ports, the second array of light emitting ports being provided at a third physical location relatively remote from the first physical location;

providing a second spatial light modulator at the third physical location;

optically coupling the first physical location to the third physical location for conveying light from the plurality of sources of light to the second array of light emitting ports; and conveying the selected source of light from the first physical location to the second array of light emitting ports, enabling one of the plurality of light emitting ports within the second array of light emitting ports to emit the selected source of light during a respective time interval, and directing light emitted by the enabled light emitting port at the second spatial light modulator at the third physical location to create a modulated light image at the third physical location during the respective time interval.

33. A display system for creating a plurality of light images from a spatial light modulator, the spatial light modulator being arranged to selectively modulate a two-dimensional light image in accordance with electrical signals applied to the spatial light modulator, the display system comprising:

a plurality of spatially-separated light source elements to selectively direct light at the spatial light modulator;

a first multiplexer to alternately select at least one of the plurality of spatially-separated light source elements to direct light at the spatial light modulator during a corresponding time interval of a display cycle;

a controller coupled to the spatial light modulator to apply electrical signals to the spatial light modulator during each time interval, the applied electrical signals determining the two-dimensional light image produced by the spatial light modulator during each time interval;

a plurality of spatially-separated lenses disposed proximate to the spatial light modulator, each of the spatially-separated lenses to receive a predetermined light image emitted by the spatial light modulator during a corresponding time interval, and to focus the predetermined light image toward a corresponding portion of an image plane; wherein the plurality of light images are focused toward the image plane over a plurality of time intervals in each display cycle.

34. The display system of claim 33, wherein the controller is coupled to the first multiplexer to synchronize the selection of the plurality of spatially-separated light source elements with electrical signals applied to the spatial light modulator.

35. The display system of claim 33, further comprising a projection lens to: receive the plurality of light images focused toward the image plane; magnify the plurality of light images; and project the plurality of light images to form a high resolution image on a surface.

36. The display system of claim 33, wherein the spatial light modulator is a digital micromirror device.

37. The display system of claim 33, wherein the plurality of spatially-separated light source elements are arranged in a two-dimensional array.

38. The display system of claim 37, wherein the plurality of spatially-separated lenses are arranged in a two-dimensional array.

39. The display system of claim 33, further comprising:

a transparent plate disposed between the spatial light modulator and the plurality of spatially-separated lenses, the transparent plate having an index of refraction and being movable along a first axis between a first position relative to the spatial light modulator and a second position relative to the spatial light modulator, for selectively refracting light rays passing from the spatial light modulator to the spatially-separated lenses;

wherein the transparent plate is for: receiving a first group of light rays from the spatial light modulator during the first time interval for passage to the spatially-separated lenses with a lesser amount of refraction; and receiving a second group of light rays from the spatial light modulator during the second time interval for passage to the spatially-separated lenses with a greater amount of refraction.

40. The display system of claim 39, wherein the transparent plate is also movable along a second axis relative to the spatial light modulator, the second axis lying orthogonal to the first axis.

41. A display system using at least one remote light source for creating multiple light images from a spatial light modulator, the spatial light modulator being disposed in a first enclosure to selectively modulate a two-dimensional light image in accordance with electrical signals applied to the spatial light modulator, the display system comprising:

a plurality of spatially-separated light emitting ports in the first enclosure to selectively direct light at the spatial light modulator;

at least one remote source of light disposed in a second enclosure separate from the first enclosure;

a plurality of optical pathways coupled between the first enclosure and the second enclosure to transmit light from the at least one remote source of light in the second enclosure to the light emitting ports of the first enclosure;

a controller coupled to the spatial light modulator to apply electrical signals to the spatial light modulator during a plurality of time intervals, the applied electrical signals determining the two-dimensional light image produced by the spatial light modulator during each time interval;

a multiplexer to alternately select at least one of the optical pathways during each time interval to provide light to at least one of the light emitting ports during a corresponding time interval of a display cycle; and a plurality of spatially-separated lenses disposed proximate to the spatial light modulator, each of the spatially-separated lenses to receive rays of light emitted by the spatial light modulator during a corresponding time interval, and to focus the rays of light toward a corresponding portion of a display plane.

* * * * *